(12) United States Patent
Tanaka et al.

(10) Patent No.: US 10,868,342 B2
(45) Date of Patent: Dec. 15, 2020

(54) CHARGE AND DISCHARGE CONTROL DEVICE, CHARGE AND DISCHARGE CONTROL METHOD, BATTERY PACK, ELECTRONIC EQUIPMENT, ELECTRIC VEHICLE, POWER TOOL AND POWER STORAGE SYSTEM

(71) Applicant: MURATA MANUFACTURING CO., LTD., Kyoto (JP)

(72) Inventors: Masatomo Tanaka, Kyoto (JP); Naoki Koshitani, Kyoto (JP); Yuto Horiuchi, Kyoto (JP); Kazuhiko Morizawa, Kyoto (JP); Shigetaka Tomiya, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 145 days.

(21) Appl. No.: 16/167,058

(22) Filed: Oct. 22, 2018

(65) Prior Publication Data

US 2019/0054837 A1 Feb. 21, 2019

Related U.S. Application Data

(63) Continuation of application No. PCT/JP2017/000956, filed on Jan. 13, 2017.

(30) Foreign Application Priority Data

Apr. 22, 2016 (JP) ................................. 2016-086488

(51) Int. Cl.
*H02J 7/04* (2006.01)
*H01M 10/42* (2006.01)
(Continued)

(52) U.S. Cl.
CPC ........... *H01M 10/425* (2013.01); *B60L 58/10* (2019.02); *H01M 10/44* (2013.01);
(Continued)

(58) Field of Classification Search
CPC .................................................... H01M 10/425
(Continued)

(56) References Cited

U.S. PATENT DOCUMENTS

2015/0152039 A1* 6/2015 Kang .................... C07C 67/347
560/120
2015/0236529 A1* 8/2015 Tanaka .................... B60L 50/51
320/109
(Continued)

FOREIGN PATENT DOCUMENTS

JP 2012222895 A 11/2012
JP 2013182768 A 9/2013

OTHER PUBLICATIONS

Japan Patent Office, International Search Report for Application No. PCT/JP2017/000956, dated Feb. 14, 2017.

*Primary Examiner* — Yalkew Fantu
(74) *Attorney, Agent, or Firm* — K&L Gates LLP

(57) ABSTRACT

A charge and discharge control device is provide. The charge and discharge control device includes a determination circuitry configured to determine an ion diffusion rate associated with electric conduction in a secondary battery, and determine a time integrated value of an overcharged amount of an active material based on the ion diffusion rate and a charge condition; an evaluation circuitry configured to evaluate the charge condition of the secondary battery based on a determination result obtained by the determination circuitry; and a charge and discharge controller configured to control state of current application and voltage application to the secondary battery at a time of charging or discharging (Continued)

the secondary battery based on an evaluation result obtained by the evaluation circuitry.

13 Claims, 16 Drawing Sheets

(51) Int. Cl.
    *B60L 58/10*    (2019.01)
    *H01M 10/44*    (2006.01)
    *H02J 7/02*    (2016.01)
    *H02J 7/00*    (2006.01)
    *H01M 10/48*    (2006.01)

(52) U.S. Cl.
    CPC ....... *H01M 10/443* (2013.01); *H01M 10/486* (2013.01); *H02J 7/0047* (2013.01); *H02J 7/0077* (2013.01); *H02J 7/02* (2013.01); *H02J 7/045* (2013.01); *H01M 2010/4271* (2013.01); *H02J 7/00302* (2020.01); *H02J 2007/0067* (2013.01)

(58) Field of Classification Search
    USPC .......................................................... 320/152
    See application file for complete search history.

(56) References Cited

U.S. PATENT DOCUMENTS

2018/0226686 A1\* 8/2018 Tanaka .................. H02J 7/0077
2018/0269540 A1\* 9/2018 Tanaka .................... H02J 7/007

\* cited by examiner

101
DRILL
PART

CHARGE AND DISCHARGE CONTROL DEVICE, CHARGE AND DISCHARGE CONTROL METHOD, BATTERY PACK, ELECTRONIC EQUIPMENT, ELECTRIC VEHICLE, POWER TOOL AND POWER STORAGE SYSTEM

CROSS REFERENCE TO RELATED APPLICATIONS

The present application is a continuation of PCT patent application no. PCT/JP2017/000956, filed on Jan. 13, 2017, which claims priority to Japanese patent application no. JP2016-086488 filed on Apr. 22, 2016, the entire contents of which are being incorporated herein by reference.

BACKGROUND

The present disclosure generally relates to a charge and discharge control device and a charge and discharge control method. More particularly, the present disclosure relates to a charge and discharge control device, a charge and discharge control method, a battery pack, an electronic equipment, an electric vehicle, a power tool, and a power storage system.

At present, secondary batteries, particularly lithium ion secondary batteries, are required to have high capacity and high performance. Therefore, technological developments such as increasing the thickness and density of the electrode and introducing materials having a higher Li storage capacity than conventional materials are being carried out. However, a battery using the electrode with increased thickness and density and a novel material has a problem of causing a rapid degradation phenomenon in which electric capacity that can be taken out remarkably decreases by gradually progressing a degradation reaction inside the battery as a long-term use, and dominantly occurring a side reaction different from a normal charge/discharge reaction at a certain timing.

One of the reasons is a phenomenon called reversible Li loss (a phenomenon in which the amount of Li that moves between a positive electrode and a negative electrode and exchanges electrons decreases) that Li released from the positive electrode at the time of charging precipitates as a Li-containing compound or Li metal without being sucked into a negative electrode active material, thereby reducing the amount of Li that can be used for a normal charge/discharge reaction. When this reversible Li loss occurs at an accelerated rate, the charge/discharge efficiency remarkably decreases. Therefore, attempts are being made to suppress cycle degradation by performing charge/discharge control based on the result of estimating the state of the battery during charging/discharging.

One of the attempts is a technique of calculating the internal resistance of a secondary battery and controlling so as to avoid the secondary battery from a predetermined degradation promotion region, based on the calculation result. In this technique, it is possible to restrict battery capacity not to be used when an internal resistance of a certain value or more is detected. However, since there is a plurality of factors that increase the internal resistance, an increase in the internal resistance which is not caused by rapid degradation is also detected, resulting in a problem that the available energy density is lowered.

Another attempt is a technique of prescribing a negative electrode voltage with respect to a lithium reference electrode to a range not exceeding 0.6 V, in order to suppress the occurrence of polarization phenomenon of a negative electrode active material storing Li due to discharge.

In the technique as described above, the negative electrode voltage with respect to the lithium reference electrode is prescribed in a range not exceeding 0.6 V, but there is a problem that the volumetric energy density is lowered by this prescription.

In these techniques as described above, concerning the problem that the cycle characteristics, which are one of the important characteristics for attaining high capacity and high performance of the secondary battery, deteriorate, it cannot be said that adequate measures have yet been taken from the viewpoint of charge/discharge control.

SUMMARY

The present disclosure generally relates to a charge and discharge control device and a charge and discharge control method. More particularly, the present disclosure relates to a charge and discharge control device, a charge and discharge control method, a battery pack, an electronic equipment, an electric vehicle, a power tool, and a power storage system.

The present disclosure has been made in view of such problems as described above, and it is an object of the present invention to provide a charge and discharge control device and a charge and discharge control method capable of improving cycle characteristics without lowering volumetric energy density of a secondary battery.

As a result of extensive research to solve the above object, the inventors of the present invention have focused to a time integrated value of the charge state of a negative electrode and have completed the present disclosure.

According to an embodiment of the present disclosure, a charge and discharge control device is provided. The charge and discharge control device includes a determination circuitry configured to determine an ion diffusion rate associated with electric conduction in a secondary battery, and determine a time integrated value of an overcharged amount of an active material based on the ion diffusion rate and a charge condition; an evaluation circuitry configured to evaluate the charge condition of the secondary battery based on a determination result obtained by the determination circuitry; and a charge and discharge controller configured to control state of current application and voltage application to the secondary battery at a time of charging or discharging the secondary battery based on an evaluation result obtained by the evaluation circuitry.

According to another embodiment of the present disclosure, a charge and discharge control method is provided. The charge and discharge control method includes a determination step of determining an ion diffusion rate associated with electric conduction in a secondary battery, and determines a time integrated value of an overcharged amount of an active material based on the ion diffusion rate and a charge condition; an evaluation step of evaluating the charge condition of the secondary battery based on a determination result from the determination step; and a control step of controlling state of current application and voltage application to the secondary battery at a time of charging or discharging the secondary battery based on an evaluation result from the evaluation step.

According to the present disclosure, it is possible to provide a charge and discharge control device and a charge and discharge control method capable of improving cycle characteristics without lowering volumetric energy density of a secondary battery. The effects described herein are not

DETAILED DESCRIPTION

The present disclosure generally relates to a charge and discharge control device and a charge and discharge control method. More particularly, the present disclosure relates to a charge and discharge control device, a charge and discharge control method, a battery pack, an electronic equipment, an electric vehicle, a power tool, and a power storage system. As described herein, the present disclosure will be described based on examples with reference to the drawings, but the present disclosure is not to be considered limited to the examples, and various numerical values and materials in the examples are considered by way of example.

First, a charge control method, a manufacturing method, and a charge/discharge control device of a secondary battery according to a first embodiment of the present disclosure will be described.

Figure 1:
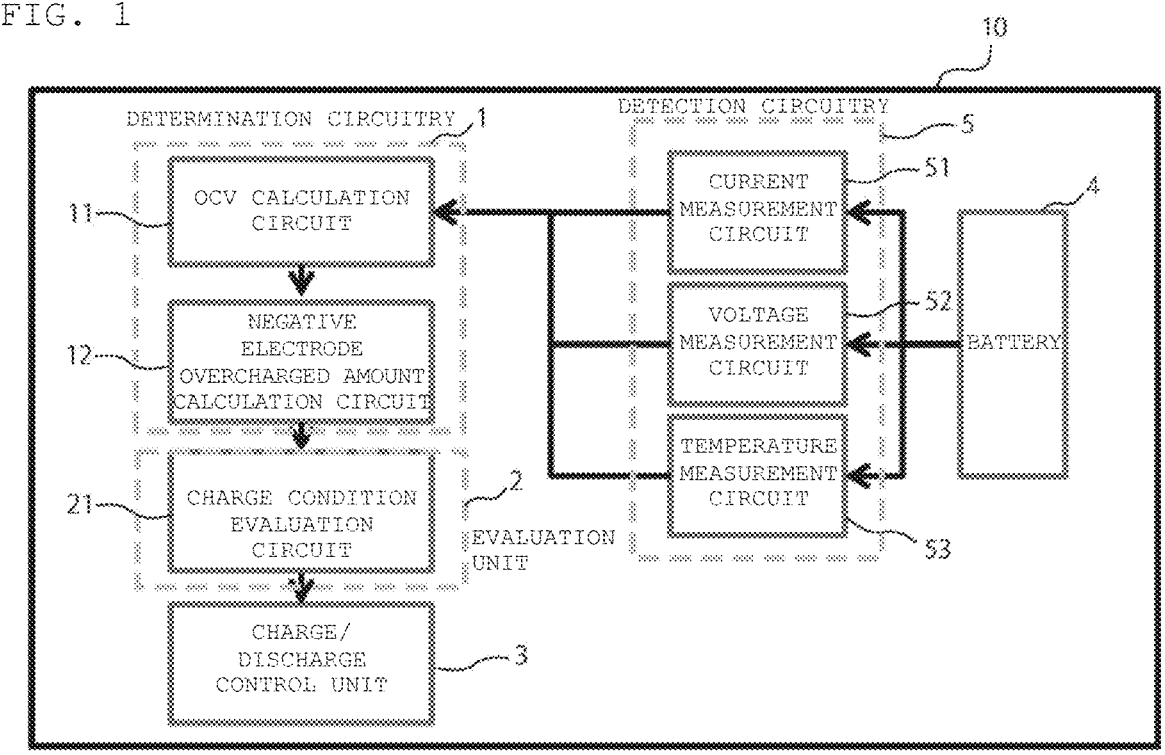
FIG. 1 is a schematic conceptual diagram illustrating an embodiment of a charge/discharge control device according to the present disclosure.

FIG. 1 is a schematic conceptual diagram schematically showing a first embodiment of a charge/discharge control device 10 according to the present disclosure. The charge/discharge control device 10 according to the present disclosure roughly includes a determination circuitry 1, a state evaluation circuitry 2, and a charge/discharge control unit 3 (charge and discharge controller). Each of the determination circuitry 1, the state evaluation circuitry 2 and the charge/discharge control unit 3 may include a processor. Reference symbol 4 in FIG. 1 indicates a secondary battery. In addition, the charge/discharge control device 10 may further include a detection circuitry 5 and the like as necessary. Each part will be described in detail below.

The detection circuitry 5 includes a current measurement circuit 51, a voltage measurement circuit 52, and a temperature measurement circuit 53. Each circuit can be configured using well-known circuits. The current measurement circuit 51 measures current flowing through a secondary battery 4 and outputs the measurement result to the determination unit 1. The voltage measurement circuit 52 measures voltage of the secondary battery 4 and outputs the measurement result to the determination circuitry 1. The temperature measurement circuit 53 measures surface temperature of the secondary battery 4 and outputs the measurement result to the determination circuitry 1.

The determination circuitry 1 calculates OCV of the battery, determines the diffusion rate of ions responsible for electric conduction based on a voltage response analysis result at the time of applying and stopping a constant current and a current response analysis result at the time of applying a constant voltage, calculates the concentration distribution of lithium using the diffusion rate, and calculates the time integrated value of charge depth of a negative electrode outermost surface. The determination circuitry 1 includes an OCV (open circuit voltage) calculation circuit 11 and a negative electrode overcharged amount calculation circuit 12. Furthermore, the determination circuitry 1 can include a charge condition optimization circuit. The charge condition optimization circuit determines the charge control condition based on the calculation result of the negative electrode overcharged amount. The charge condition optimization circuit outputs a charge condition of a combination of CC charge and CV charge such that the overcharged amount becomes small. Based on this output result, charge control is performed by a charge/discharge control unit 3 (charge and discharge controller). The determination circuitry 1 analyzes the concentration distribution relating to the degradation reaction of the battery, thereby determining the state of the battery under a certain charge condition in detail.

Figure 2:
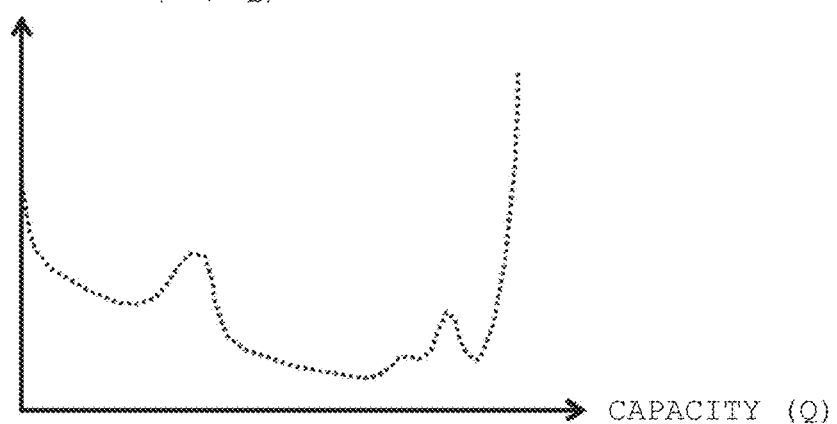
FIG. 2 is an example of a waveform with the rate of change (dV/dQ) as the vertical axis and capacity (Q) as the horizontal axis.
Figure 3:
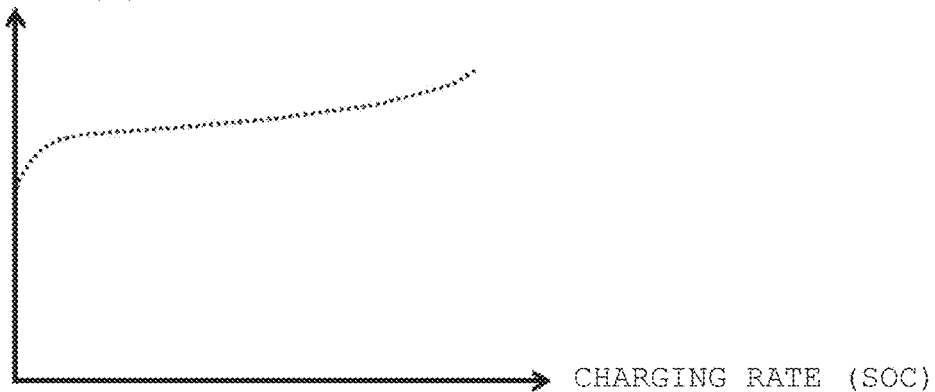
FIG. 3 is an example of a SOC-OCV curve of a positive electrode.
Figure 4:
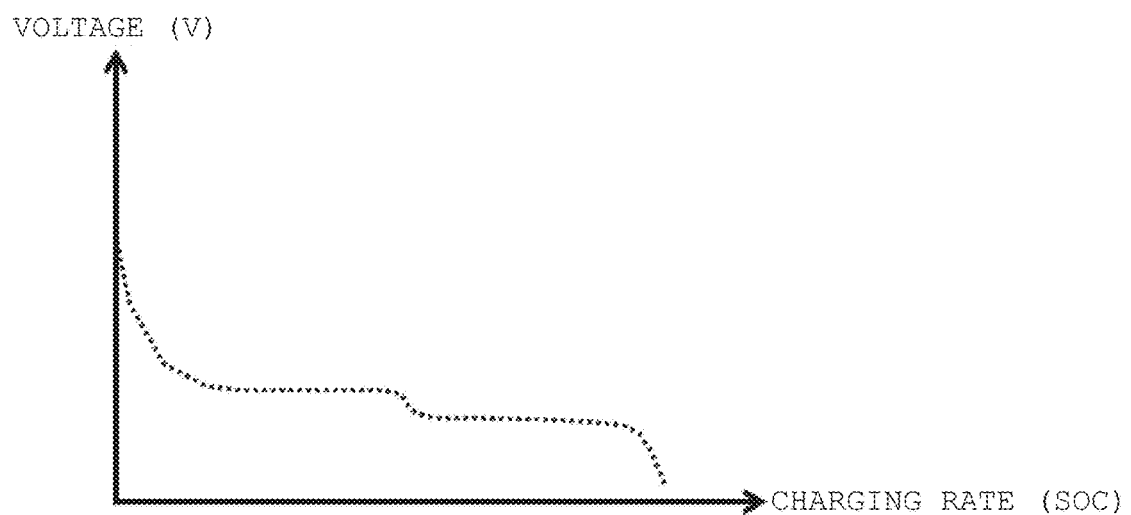
FIG. 4 is an example of a waveform illustrating a calculation result of SOC-OCV of a negative electrode.

An OCV calculation circuit 11 calculates OCV information (maximum lithium concentration and initial lithium concentration of a positive electrode and a negative electrode) necessary for calculating the overcharged amount. As a specific example, the OCV calculation circuit 11 calculates OCV, based on the position of the inflection point on a waveform with the rate of change (dV/dQ) of voltage (V) to capacity (Q) as the vertical axis and the capacity (Q) as the horizontal axis. FIG. 2 shows an example of a waveform with the rate of change (dV/dQ) as the vertical axis and the capacity (Q) as the horizontal axis. There is no particular limitation on the calculation method of OCV. For example, the OCV calculation circuit 11 may calculate OCV using a reference data of a SOC-OCV curve indicating a relationship with a charging rate (SOC). FIG. 3 shows an example of the SOC-OCV curve of the positive electrode. FIG. 4 shows an example of the SOC-OCV curve of the negative electrode.

In the negative electrode overcharged amount calculation circuit 12, using a diffusion parameter determined in the determination circuitry 1 and the SOC-OCV curve determined in the OCV estimation circuit 11, the thickness direction in the electrode and the lithium concentration distribution inside the active material are analyzed. For the method of analyzing the lithium concentration distribution, it is possible to use a known model such as the Newman model. A concentration of an outermost surface of a negative electrode active material is calculated, and charge depth is calculated from the concentration of an outermost surface of a negative electrode. Calculation may be done on an IC, or any form such as passing information to cloud by communication and receiving a result may be used. The position where the concentration of the outermost surface of the negative electrode exceeds a certain fixed value is determined as a negative electrode overcharge region, and its thickness is calculated. The value of the negative electrode overcharged amount is successively calculated for each charging time and integrated, and the value when fully charged is calculated. Here, the negative electrode overcharged amount refers to the thickness of overcharge. The negative electrode overcharged amount calculation circuit 12 analyzes the concentration on the outermost surface relating to the degradation reaction of the battery, thereby determining the state of the battery under a certain charge condition in detail.

The state evaluation circuitry 2 evaluates the state of the secondary battery 4, based on the determination result of the determination circuitry 1. The state of the secondary battery means a voltage response state with respect to the capacity of the secondary battery. The state evaluation circuitry 2 of the present disclosure includes a charge condition evaluation circuitry 21.

The charge condition evaluation circuit 21 is a part that determines a charge condition so as to minimize the time integrated value of the negative electrode overcharged amount calculated in the negative electrode overcharged amount calculation unit while satisfying a predetermined charging time. It may be a unit that determines the charge condition according to table data to be prepared in advance, a unit that calculates the optimization solution on the spot, such as successive quadratic programming, genetic algorithm, multi-objective optimization method, or successive approximation optimization method.

The diffusion rate of ions in the determination circuitry 1 may simply observe a response of the voltage at the time of applying current or may be extracted from a component synchronized with current and a component that responds late to current by performing a time constant analysis from a relaxation component after cutting off the current. As a result of voltage response analysis at the time of applying current, the diffusion rate is determined.

As another method of determining the diffusion rate, for example, a method of measuring the voltage response for each time constant at the time of charging and extracting the diffusion component of the internal resistance, using a method such as a PITT (Potentiostatic Intermittent Titration Technique) method, a GITT (Galvanostatic Intermittent Titration Technique) method, an EIS (Electrochemical Impedance Spectroscopy) method or a current pulse relaxation method, may be used, or the diffusion component may be extracted from the analysis of response obtained as a result of independently applying or superimposing and applying current or voltage of a rectangular wave or a sine wave.

The charge/discharge controller 3 including a processor controls the states of current application and voltage application to the secondary battery 4 at the time of charging or discharging the secondary battery 4, based on the evaluation result of the state evaluation circuitry 2. The charge/discharge control method by the charge/discharge control unit 3 has one or more controls besides normal charge/discharge control. The control other than the normal control herein may be one or more.

The inventors of the present invention have found that, by performing control in consideration of the time integrated value of the negative electrode overcharged amount in addition to normal charge control, degradation due to reversible Li loss is suppressed, and cycle characteristics are improved without lowering volumetric energy density and without extending charging time. Regarding the control method different from the normal charge control, there is no particular limitation on the mode as long as the time integrated value of the overcharged amount of the negative electrode becomes small. For example, it is possible to have high and low current density, and provide a pause time on the way. For example, as a typical example, there is a case where the current value at the time of constant current charging is changed in each charge state. More specifically, examples include control in which, at the time of constant current charging, the charge amount is increased (allowing a large current) when the negative electrode overcharged amount is smaller than a threshold value, and the charge amount (current value) is decreased when the negative electrode overcharged amount is larger than the threshold value, and the like. Also, there is no particular limitation on the mode as long as the negative electrode overcharged amount becomes small, such as a method of controlling the constant voltage control in a stepwise manner, or a form like constant power charging, constant resistance charging, or the like.

In the charge/discharge control device 10 including a state detection circuitry 5, the evaluation circuitry 2, and the charge/discharge control unit 3 (charge and discharge controller), for detecting and evaluating the state of the secondary battery of the present disclosure including various preferred embodiments and configurations described above), as an example, the secondary battery 4 is composed of a lithium ion secondary battery. The configuration of the lithium ion secondary battery 4 and its manufacturing method will be described below.

The secondary battery 4 is, for example, a so-called laminated film type, and includes a wound electrode body inside a film-like exterior member. The wound electrode body is one in which a positive electrode and a negative electrode are laminated with a separator and an electrolyte layer interposed therebetween and then wound. A positive electrode lead is attached to the positive electrode, and a negative electrode lead is attached to the negative electrode. The outermost peripheral portion of the wound electrode body is protected by a protective tape.

Specifically, the positive electrode and the negative electrode are opposed to each other with the separator interposed therebetween. The electrolyte layer is disposed between the positive electrode and the separator and is disposed between the negative electrode and the separator.

The positive electrode lead and the negative electrode lead are led out in the same direction, for example, from the inside to the outside of the exterior member. The positive electrode lead is formed of, for example, a conductive material such as aluminum, and the negative electrode lead is formed of, for example, a conductive material such as copper, nickel, or stainless steel. These conductive materials have, for example, a thin plate or mesh shape.

The exterior member is, for example, a laminated film in which a fusion layer, a metal layer, and a surface protective layer are laminated in this order. In the laminated film, for example, outer peripheral edge portions of fusion layers of two sheets of films are fused with each other so that the fusion layers face the wound electrode body. However, the two sheets of films may be stuck together via an adhesive or the like. The fusion layer is, for example, a film such as polyethylene or polypropylene. The metal layer is, for example, an aluminum foil or the like. The surface protective layer is, for example, a film such as nylon or polyethylene terephthalate.

Among them, it is preferable that the exterior member is an aluminum laminated film in which a polyethylene film, an aluminum foil, and a nylon film are laminated in this order. However, the exterior member may be a laminated film having another laminated structure, a polymer film such as polypropylene, or a metal film.

An adhesive film is inserted between the exterior member and the positive electrode lead and the negative electrode lead, in order to prevent intrusion of outside air. This adhesive film is formed of a material having adhesion to the positive electrode lead and the negative electrode lead. The material having adhesion is, for example, a polyolefin resin such as polyethylene, polypropylene, modified polyethylene, or modified polypropylene.

The positive electrode has a positive electrode active material layer on one side or both sides of the positive electrode current collector. The positive electrode current collector is formed of, for example, a conductive material such as aluminum, nickel, or stainless steel.

The positive electrode active material layer contains any one or more kinds of positive electrode materials capable of storing and releasing lithium ions as a positive electrode active material, and may contain other materials such as a positive electrode binder and a positive electrode conductive agent, as necessary.

The positive electrode material is preferably a lithium-containing compound. This is because a high energy density can be obtained. The lithium-containing compound is, for example, a lithium transition metal complex oxide, a lithium transition metal phosphate compound, or the like. The lithium transition metal complex oxide is an oxide containing Li and one or more transition metal elements as constituent elements, and the lithium transition metal phosphate compound is a phosphate compound containing Li and one or more transition metal elements as constituent elements. Among them, the transition metal element is preferably any one or more kinds of Co, Ni, Mn, Fe and the like. This is because a higher voltage can be obtained. Its chemical formula is represented by, for example, $LixM1O_2$ and $LiyM2PO_4$. In the formula, M1 and M2 are each one or more kinds of transition metal elements. The values of x and y vary depending on the charge/discharge state, but for example, $0.05 \le x \le 1.1$ and $0.05 \le y \le 1.1$.

The lithium transition metal complex oxide is, for example, $LiCoO_2$, $LiNiO_2$, a lithium nickel-based composite oxide represented by the following formula (1), or the like. The lithium transition metal phosphate compound is, for example, $LiFePO_4$, $LiFe1-u MnuPO_4$ (u<1), or the like. This is because a high battery capacity can be obtained and excellent cycle characteristics and the like can be also obtained.

$$LiNi_{1-z}M_zO_2 \qquad (1)$$

(M is any one or more kinds of Co, Mn, Fe, Al, V, Sn, Mg, Ti, Sr, Ca, Zr, Mo, Tc, Ru, Ta, W, Re, Yb, Cu, Zn, Ba, B, Cr, Si, Ga, P, Sb, and Nb. z satisfies 0.005<z<0.5.)

Besides, the positive electrode material may be, for example, any one or more kinds of oxides, disulfides, chalcogenides, conductive polymers, and the like. The oxide is, for example, titanium oxide, vanadium oxide, manganese dioxide, and the like. The disulfide is, for example, titanium disulfide, molybdenum sulfide, and the like. The chalcogenide is, for example, niobium selenide and the like. The conductive polymer is, for example, sulfur, polyaniline, polythiophene, and the like. However, the positive electrode material may be a material other than those mentioned above.

The positive electrode binder is, for example, any one or more kinds of synthetic rubbers, polymer materials, and the like. The synthetic rubber is, for example, styrene-butadiene rubber, fluorine rubber, ethylene propylene diene, and the like. The polymer material is, for example, polyvinylidene fluoride, polyimide, and the like.

The positive electrode conductive agent is, for example, any one or more kinds of carbon materials and the like. The carbon material is, for example, graphite, carbon black, acetylene black, ketjen black, and the like. The positive electrode conductive agent may be a metal material, a conductive polymer, or the like as long as it is a material having conductivity.

A negative electrode active material layer contains a negative electrode active material and a negative electrode binder, and the negative electrode active material contains any one or more kinds of negative electrode materials capable of storing and releasing lithium ions. However, the negative electrode active material layer may contain other materials such as a negative electrode conductive agent, as necessary. The details of the negative electrode conductive agent are, for example, the same as those of the above-described positive electrode conductive agent.

The chargeable capacity of the negative electrode material is preferably larger than the discharge capacity of the positive electrode in order to prevent lithium metal from being unintentionally precipitated during charging. More specifically, it is preferable that the electrochemical equivalent of the negative electrode material capable of storing and releasing lithium ions is larger than the electrochemical equivalent of the positive electrode.

A first negative electrode active material is a material (metal-based material) containing any one or two of metal elements or metalloid elements that react with Li as constituent elements. This is because a high energy density can be obtained. The metal-based material may be a simple substance, an alloy or a compound, or two or more kinds thereof, or a material having one or more kinds of phases at least in a part. The "alloy" includes not only materials composed of two or more kinds of metal elements but also materials containing one or more kinds of metal elements and one or more kinds of metalloid elements. Further, the "alloy" may contain a nonmetallic element. The structure includes a solid solution, a eutectic (eutectic mixture), an intermetallic compound, or one in which two or more kinds thereof coexist.

The metal elements or metalloid elements described above are, for example, any one or more kinds of metal elements and metalloid elements capable of forming an alloy with lithium ions, specifically, Mg, B, Al, Ga, In, Si, Ge, Sn, Pb, Bi, Cd, Ag, Zn, Hf, Zr, Y, Pd, Pt, and the like. Among them, one or both of Si and Sn are preferable. This is because the ability to store and release lithium ions is excellent and a high energy density can be obtained, so that a high battery capacity can be obtained.

A material (high-capacity material) containing one or both of Si and Sn as constituent elements may be a simple substance of Si or Sn, an alloy or a compound of Si and Sn, or two or more kinds thereof, or a material having one or more kinds of phases at least in a part. However, the term "simple substance" as used herein is a simple substance (which may contain trace amounts of impurities) in a general sense, and does not necessarily mean a purity of 100%.

The alloy of Si contains, for example, any one or more kinds of elements of Sn, Ni, Cu, Fe, Co, Mn, Zn, In, Ag, Ti, Ge, Bi, Sb, Cr and the like, as constituent elements other than Si. The compound of Si contains, for example, any one or more kinds of C, O and the like, as constituent elements other than Si. The compound of Si may contain, for example, any one or more kinds of the elements described for the alloy of Si, as constituent elements other than Si.

Specific examples of the alloys or compounds of Si are $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, SiOv (0<v≤2), and Li$x$-SiOy (0<x≤4, 0<y≤4), and the like. Incidentally, v in SiOv is desirably 0.2<v<1.4, and more desirably 0.8<v<1.2. Further, these alloys and compounds may preliminarily store lithium.

The alloy of Sn contains, for example, any one or more kinds of Si, Ni, Cu, Fe, Co, Mn, Zn, In, Ag, Ti, Ge, Bi, Sb, Cr and the like, as constituent elements other than Sn. The compound of Sn contains, for example, any one or more kinds of constituent elements such as C and O, as constituent elements other than Sn. The compound of Sn may contain, for example, any one or more kinds of elements described for the alloys of Sn, as constituent elements other than Sn. Specific examples of the alloys or compounds of Sn are SnOw (0<w≤2), $SnSiO_3$, LiSnO, $Mg_2Sn$, and the like.

In particular, as a material containing Sn as a constituent element, for example, a material containing Sn as a first constituent element, and in addition, containing second and third constituent elements is preferable. The second constituent element is, for example, any one or more kinds of Co, Fe, Mg, Ti, V, Cr, Mn, Ni, Cu, Zn, Ga, Zr, Nb, Mo, Ag, In, Ce, Hf, Ta, W, Bi, Si, and the like. The third constituent element is, for example, any one or more kinds of B, C, Al, P, and the like. This is because high energy density and the like can be obtained by containing the second and third constituent elements.

Among them, a material containing Sn, Co and C as constituent elements (SnCoC-containing material) is preferable. In this SnCoC-containing material, for example, the content of C is 9.9% by mass to 29.7% by mass, and the ratio of the content of Sn and Co (Co/(Sn+Co)) is 20% by mass to 70% by mass. This is because a high energy density can be obtained.

The SnCoC-containing material has a phase containing Sn, Co and C, and the phase is preferably low crystalline or amorphous. Since this phase is a reaction phase capable of reacting with Li, excellent properties can be obtained due to the presence of the reaction phase. A half value width of a diffraction peak obtained by X-ray diffraction of the phase is preferably 10 or more at a diffraction angle 2θ when CuKα ray is used as specific X ray and an insertion rate is 1°/min. This is because lithium ions are stored and released more smoothly and reactivity with the electrolyte solution is reduced. The SnCoC-containing material may include a phase including a simple substance or a part of constituent element, in addition to a low crystalline or amorphous phase.

Whether or not the diffraction peak obtained by X-ray diffraction corresponds to the reaction phase capable of reacting with Li can be easily determined by comparing X-ray diffraction charts before and after electrochemical reaction with Li. For example, when the position of the diffraction peak changes before and after the electrochemical reaction with Li, it corresponds to the reaction phase capable of reacting with Li. In this case, for example, a diffraction peak of the low crystalline or amorphous reaction phase is observed between 2θ=20° to 50°. Such a reaction phase has, for example, each of the above-mentioned constituent elements, and is thought to be low crystallized or amorphized mainly due to the presence of C.

In the SnCoC-containing material, it is preferable that at least a part of C as a constituent element is bonded to a metal element or a metalloid element as other constituent element. This is because aggregation and crystallization of Sn and the like are suppressed. The bonding state of the elements can be confirmed, for example, using X-ray photoelectron spectroscopy (XPS). For commercially available devices, for example, Al-Kα ray, Mg-Kα ray, and the like are used as soft X-rays. When at least a part of C is bonded to a metal element, a metalloid element, or the like, the peak of a composite wave of the 1s orbit (C1s) of C appears in a region lower than 284.5 eV. Energy calibration shall be performed so that the peak of the 4f orbit (Au4f) of Au atom is obtained in 84.0 eV. At this time, since surface contamination carbon usually exists on the material surface, the peak of C1s of the surface contamination carbon is regarded as 284.8 eV, which is used as the energy standard. In XPS measurement, since a waveform of the peak of C1s is obtained as a form including the peak of the surface contamination carbon and the peak of carbon in the SnCoC-containing material, both peaks are separated by analyzing using, for example, a commercially available software. In the waveform analysis, the position of the main peak present on the lowest bound energy side is defined as the energy standard (284.8 eV).

Incidentally, the SnCoC-containing material is not limited to the material configured of only Sn, Co, and C (SnCoC) as constituent elements. The SnCoC-containing material may further contain, for example, any one or more kinds of Si, Fe, Ni, Cr, In, Nb, Ge, Ti, Mo, Al, P, Ga, Bi and the like as constituent elements, in addition to Sn, Co, and C.

In addition to the SnCoC-containing material, a material containing Sn, Co, Fe, and C (SnCoFeC-containing material) as constituent elements is also preferable. The composition of the SnCoFeC-containing material is arbitrary. For example, when the content of Fe is set small, the content of C is 9.9% by mass to 29.7% by mass, the content of Fe is 0.3% by mass to 5.9% by mass, and the ratio of the contents of Sn and Co (Co/(Sn+Co)) is 30% by mass to 70% by mass. In addition, when the content of Fe is set large, the content of C is 11.9°% by mass to 29.7% by mass, the ratio of the contents of Sn, Co and Fe ((Co+Fe)/(Sn+Co+Fe)) is 26.4% by mass to 48.5% by mass, and the ratio of the contents of Co and Fe (Co/(Co+Fe)) is 9.9% by mass to 79.5% by mass. This is because a high energy density can be obtained in such a composition range. The physical properties (half value width and the like) of the SnCoFeC-containing material are the same as those of the above-described SnCoC-containing material.

The second negative electrode active material is a carbon material containing graphite. This is because the potential in storing lithium ions is low, and high energy density and the like can be obtained. Also, this is because the carbon material also functions as a conductive agent. The carbon material is, for example, natural graphite, artificial graphite, a material coated with amorphous carbon, or the like. The shape of the carbon material is a fibrous, spherical, granular, scale-like shape, or the like.

Besides, the negative electrode material may be any one or more kinds of easily graphitizable carbon, hardly graphitizable carbon, metal oxides, polymer compounds, and the like. The metal oxide is, for example, iron oxide, ruthenium oxide, molybdenum oxide, or the like. The polymer compound is, for example, polyacetylene, polyaniline, polypyrrole, or the like. However, the negative electrode material may be a material other than those mentioned above.

The separator separates the positive electrode and the negative electrode, and allows lithium ions to pass while preventing short circuit of current caused by contact of both electrodes. This separator is, for example, a porous film made of a synthetic resin, a ceramic or the like, and may be a laminated film in which two or more kinds of porous films are laminated. The synthetic resin is, for example, polytetrafluoroethylene, polypropylene, polyethylene, or the like.

The electrolyte solution contains a solvent and an electrolyte salt, and may contain other materials such as additives as necessary.

The solvent includes any one or more kinds of non-aqueous solvents such as organic solvents. The non-aqueous solvent is, for example, cyclic carbonate, chain carbonate, lactone, chain carboxylic acid ester, nitrile, or the like. This is because excellent battery capacity, cycle characteristics, storage characteristics and the like can be obtained. The cyclic carbonate is, for example, ethylene carbonate, propylene carbonate, butylene carbonate or the like, and the chain carbonate is, for example, dimethyl carbonate, diethyl carbonate, ethyl methyl carbonate, methyl propyl carbonate, or the like. The lactone is, for example, γ-butyrolactone, γ-valerolactone, or the like. The carboxylic acid ester is, for example, methyl acetate, ethyl acetate, methyl propionate, ethyl propionate, methyl butyrate, methyl isobutyrate, methyl trimethylacetate, ethyl trimethylacetate, or the like. The nitrile is, for example, acetonitrile, glutaronitrile, adiponitrile, methoxyacetonitrile, 3-methoxypropionitrile, or the like.

Besides, the non-aqueous solvent may be, for example, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, dimethylsulfoxide, or the like. This is because similar advantages can be obtained.

Among them, any one or more kinds of ethylene carbonates, propylene carbonates, dimethyl carbonates, diethyl carbonates and ethyl methyl carbonates are preferred. This is because better battery capacity, cycle characteristics, storage characteristics and the like can be obtained. In this case, a combination of a high viscosity (high dielectric constant) solvent (e.g., relative permittivity ε≥30) such as ethylene carbonate or propylene carbonate and a low viscosity solvent such as dimethyl carbonate, ethyl methyl carbonate or diethyl carbonate (e.g., viscosity ≤1 mPa·s) is more preferable. This is because the dissociation property of the electrolyte salt and the mobility of ions are improved.

In particular, it is preferable that the solvent contains any one or more kinds of unsaturated cyclic ester carbonates. This is because a stable protective film is mainly formed on the surface of a negative electrode 22 at the time of charging and discharging, so that a decomposition reaction of the electrolyte solution is suppressed. The unsaturated cyclic ester carbonate is a cyclic ester carbonate containing one or more unsaturated carbon bonds (carbon-carbon double bonds), and is, for example, vinylene carbonate, vinylethylene carbonate, methylene ethylene carbonate, or the like. The content of the unsaturated cyclic ester carbonate in the solvent is not particularly limited, but is, for example, 0.01% by weight to 10% by weight.

Also, it is preferable that the solvent contains any one or more kinds of halogenated carbonates. This is because a stable protective film is mainly formed on the surface of the negative electrode 22 at the time of charging and discharging, so that a decomposition reaction of the electrolyte solution is suppressed. The halogenated carbonate is a cyclic or chain carbonate containing one or more halogens as constituent elements. The cyclic halogenated carbonate is, for example, 4-fluoro-1,3-dioxolan-2-one, 4,5-difluoro-1,3-dioxolan-2-one, or the like. The chain halogenated carbonate is, for example, fluoromethyl methyl carbonate, bis(fluoromethyl)carbonate, difluoromethyl methyl carbonate, or the like. The content of the halogenated carbonate in the solvent is not particularly limited, but is, for example, 0.01% by weight to 50% by weight.

Further, it is preferable that the solvent contains any one or more kinds of sultones (cyclic sulfonates). This is because chemical stability of the electrolyte solution is further improved. This sultone is, for example, propane sultone, propene sultone, or the like. The content of sultone in the solvent is not particularly limited, but is, for example, 0.5% by weight to 5% by weight.

Further, it is preferable that the solvent contains any one or more kinds of acid anhydrides. This is because chemical stability of the electrolyte solution is further improved. The acid anhydride is, for example, for example, carboxylic acid anhydride, disulfonic acid anhydride, carboxylic acid sulfonic acid anhydride, or the like. The carboxylic acid anhydride is, for example, succinic anhydride, glutaric anhydride, maleic anhydride, or the like. The disulfonic acid anhydride is, for example, ethanedisulfonic anhydride, propanedisulfonic anhydride, or the like. The carboxylic acid sulfonic acid anhydride is, for example, sulfobenzoic anhydride, sulfopropionic anhydride, sulfobutyric anhydride, or the like. The content of the acid anhydride in the solvent is not particularly limited, but is, for example, 0.5% by weight to 5% by weight.

The electrolyte salt includes, for example, any one or more kinds of lithium salts, and may contain salts other than the lithium salts (for example, a light metal salt other than the lithium salts, and the like) as necessary.

The lithium salt is, for example, lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). This is because excellent battery capacity, cycle characteristics, storage characteristics and the like can be obtained.

Among them, any one or more kinds of $LiPF_6$, $LiBF_4$, $LiClO_4$ and $LiAsF_6$ are preferable, and $LiPF_6$ is more preferable. This is because internal resistance is lowered, and a higher effect can be obtained.

The content of the electrolyte salt is preferably 0.3 mol/kg to 3.0 mol/kg with respect to the solvent. This is because high ion conductivity can be obtained.

This secondary battery 4 is manufactured, for example, by the following procedure.

In a first procedure, first, a positive electrode is fabricated. In this case, a positive electrode active material is mixed with a positive electrode binder and a positive electrode conductive agent and the like as necessary to prepare a positive electrode mixture. Subsequently, the positive electrode mixture is dispersed in an organic solvent or the like to obtain a paste positive electrode mixture slurry. Subsequently, the positive electrode mixture slurry is applied on both sides of the positive electrode current collector and then dried to form a positive electrode active material layer. Then, while heating as necessary, the positive electrode active material layer is compression molded using a roll press machine or the like. In this case, compression molding may be repeated a plurality of times.

Further, a negative electrode is produced by the same procedure as the above-described positive electrode. In this case, a negative electrode mixture prepared by mixing a negative electrode active material and a negative electrode binder (polymer compound for binding) and, as necessary, a negative electrode conductive agent or the like is dispersed in an organic solvent or the like to form a paste negative electrode mixture slurry. Subsequently, the negative electrode mixture slurry is applied on both sides of the negative electrode current collector and then dried to form a negative electrode active material layer, and then the negative electrode active material layer is compression molded as necessary.

Subsequently, an adhesive layer is formed on the negative electrode. In this case, a treatment solution is prepared by dispersing a polymer compound for adhesion in an organic solvent or the like, and then the treatment solution is applied on the surface of the negative electrode active material layer and then dried.

Subsequently, a precursor solution containing an electrolyte solution in which an electrolyte salt is dispersed in a solvent, a polymer compound for electrolyte, and a solvent such as an organic solvent is prepared, then the precursor solution is applied on the positive electrode to form a gel electrolyte layer. Then, a positive electrode lead is attached to the positive electrode current collector using a welding method or the like, and a negative electrode lead is attached to the negative electrode current collector using a welding method or the like. Subsequently, the positive electrode and the negative electrode are laminated with a separator interposed therebetween and then wound to prepare a wound electrode body, and then a protective tape is attached to the outermost peripheral portion. Then, after the wound electrode body is sandwiched between two film-like exterior members, the outer peripheral edge portions of the exterior members adhere each other using a thermal fusion bonding method or the like, and the wound electrode body is enclosed inside the exterior member. In this case, an adhesive film is inserted between the positive electrode lead and the negative electrode lead and the exterior member.

In a second procedure, a positive electrode and a negative electrode are formed by the same procedure as in the first procedure, a positive electrode lead is attached to the positive electrode, and a negative electrode lead is attached to the negative electrode. Subsequently, the positive electrode and the negative electrode are laminated with a separator interposed therebetween and then wound to prepare a wound body which is a precursor of the wound electrode body, and then a protective tape is attached to the outermost peripheral portion. Then, after the wound body is sandwiched between two film-like exterior members, a remaining outer peripheral edge portion excluding the outer peripheral edge portion on one side adheres using a thermal fusion bonding method or the like to store the wound body inside a bag-shaped exterior member. Subsequently, a composition for electrolyte containing an electrolyte solution, a monomer as a raw material for a polymer compound for electrolyte, a polymerization initiator, and, as necessary, other material such as a polymerization inhibitor, is prepared, and injected into the bag-shaped exterior member, and then the exterior member is hermetically sealed using a thermal fusion bonding method or the like. Then, the monomer is thermally polymerized to form a polymer compound for electrolyte. Thereby, a gel electrolyte layer is formed.

In a third procedure, a wound body is prepared and stored inside a bag-shaped exterior member in the same manner as in the second procedure, except that a separator coated with a polymer compound on both sides is used. The polymer compound to be applied on this separator is, for example, a polymer (homopolymer, copolymer or multi-component copolymer) composed of vinylidene fluoride as a component or the like. Specifically, it is polyvinylidene fluoride, a binary copolymer composed of vinylidene fluoride and hexafluoropropylene as components, a ternary copolymer weight composed of vinylidene fluoride, hexafluoropropylene and chlorotrifluoroethylene as components, or the like In addition, one or more kinds of other polymer compounds may be used together with a polymer composed of vinylidene fluoride as a component. Subsequently, an electrolyte solution is prepared and injected into the exterior member, and then a cavity of the exterior member is hermetically sealed using a thermal fusion bonding method or the like. Then, the exterior member is heated while applying a load, and the separator is brought into close contact with the positive electrode and the negative electrode with the polymer compound interposed therebetween. Accordingly, since the polymer compound is impregnated with the electrolyte solution, the polymer compound is gelatinized to form an electrolyte layer.

In the third procedure, swelling of the secondary battery 4 is suppressed more than in the first procedure. In addition, in the third procedure, since the monomer, the solvent, and the like which are the raw materials of the polymer compound are hardly left in the electrolyte layer as compared to in the second procedure, the process of forming the polymer compound is favorably controlled. Therefore, the positive electrode, the negative electrode, and the separator sufficiently closely contact to the electrolyte layer.

Figure 5:
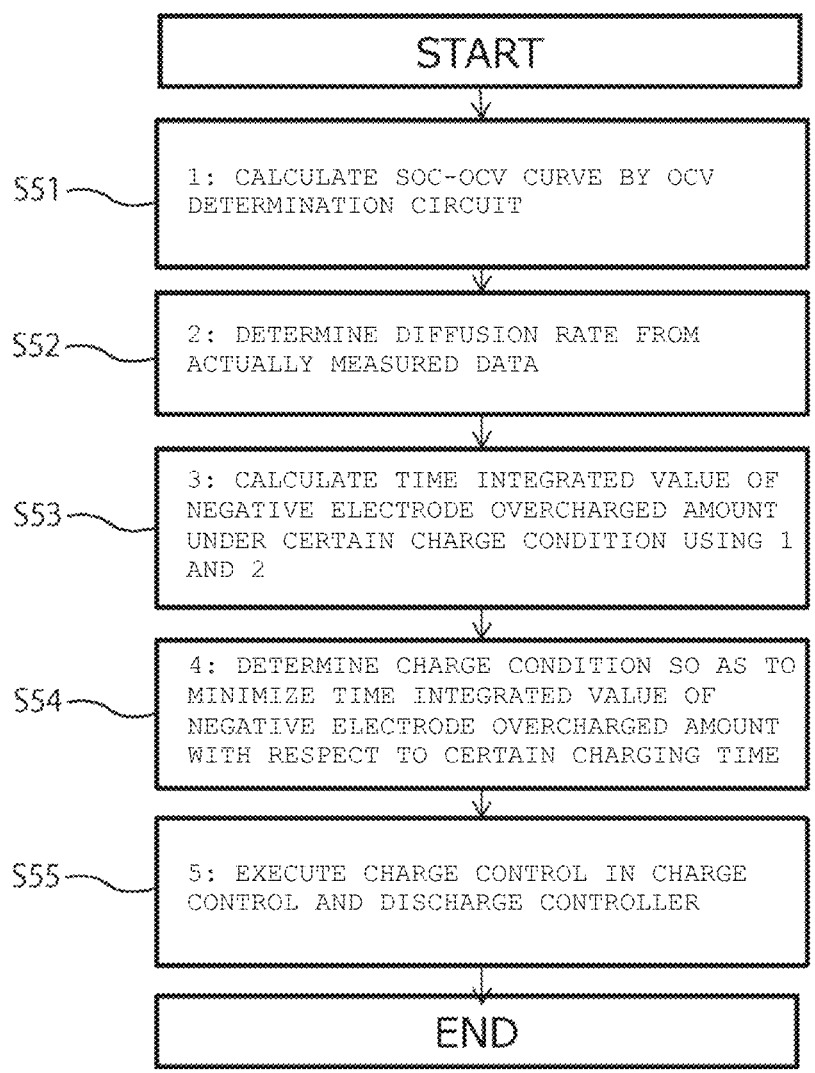
FIG. 5 is a flowchart illustrating a charge/discharge control method according to an embodiment of the present disclosure.

FIG. 5 is a flowchart showing an example of a charge control method of the secondary battery 4 in the present disclosure. In this charge control method, constant current charge (CC) is performed followed by constant voltage charge (CV).

First, in step S51, the OCV calculation unit 11 of the determination unit 1 calculates (estimates) a SOC-OCV curve.

Figure 8:
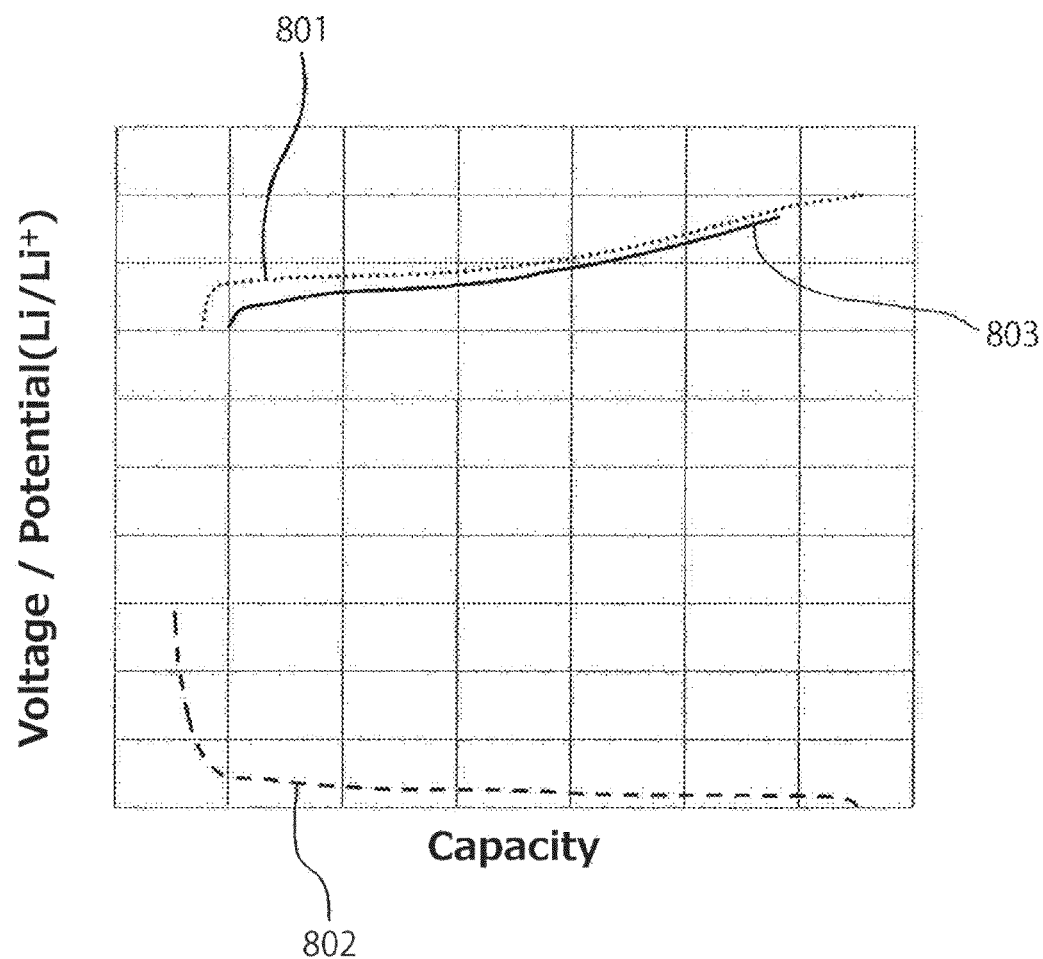
FIG. 8 is a graph illustrating an example of calculating a SOC-OCV curve according to an embodiment of the present disclosure.

FIG. 8 is a graph illustrating an example of calculating the SOC-OCV curve. As shown in FIG. 8, an equilibrium voltage curve (solid line) 803 of the opposing cell is analyzed based on a positive single pole data line segment (dotted line) 801 and a negative single pole data line segment (broken line) 802. From the analyzed equilibrium voltage curve 803, the positions and capacity of the positive electrode and the negative electrode are determined.

Next, in step S52, the OCV calculation unit 11 of the determination unit 1 determines a diffusion rate from the actually measured data.

Determination of the diffusion rate is determined by separating for each time constant of diffusion from a charging pause data, for example, using a method of applying a function obtained by deriving a function expressing an overvoltage transient response at current interruption in consideration of diffusion and migration of ions in an electrolyte solution to an actual response at current interruption of a battery, as described in Non-Patent Document 1 (Studies in Science and Technology Vol. 3, No. 2, December 2014, P. 137-144 Union Press) or the like.

Next, in step S53, the negative electrode overcharged amount calculation unit 12 of the determination unit 1 calculates when current is flowed using an output result obtained by the OCV calculation unit 11, and calculates the time integrated value of the negative electrode overcharged amount under a certain charge condition.

In the negative electrode overcharged amount calculation unit 12, for example, the following processing is executed. First, on the basis of the capacity of the positive electrode and the negative electrode determined by the OCV calculation unit 11, the output result of the charging/discharging area and the analysis result of the ion diffusion rate, numerical calculation of the lithium concentration during charging is executed using Newman model under predetermined charge conditions or the like. Second, the lithium concentration on the surface of the active material during charging is calculated by calculation in the first processing. Third, the charge state of the outermost surface is calculated from the lithium concentration on the surface of the active material during charging/the maximum lithium concentration×100. Fourth, the thickness (overcharge thickness) at which the calculation result in the third processing exceeds a certain threshold value is calculated. Fifth, the overcharge thickness during charging is integrated over time to calculate the overcharged amount.

Figure 9:
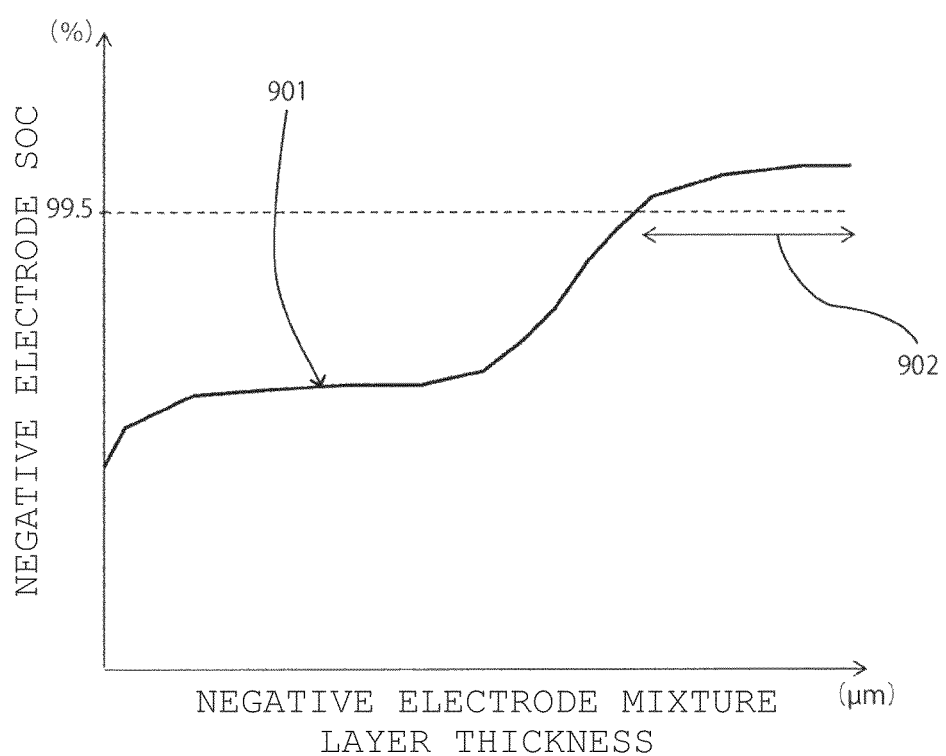
FIG. 9 is a graph illustrating an example of charge state distribution in the thickness direction of a negative electrode according to an embodiment of the present disclosure.

FIG. 9 is a graph showing an example of charge state distribution in the thickness direction of a negative electrode mixture layer. As shown in FIG. 9, from a negative electrode charging curve 901, a thickness 902 of the negative electrode mixture layer when the negative electrode SOC is 99.5% is determined.

Figure 10:
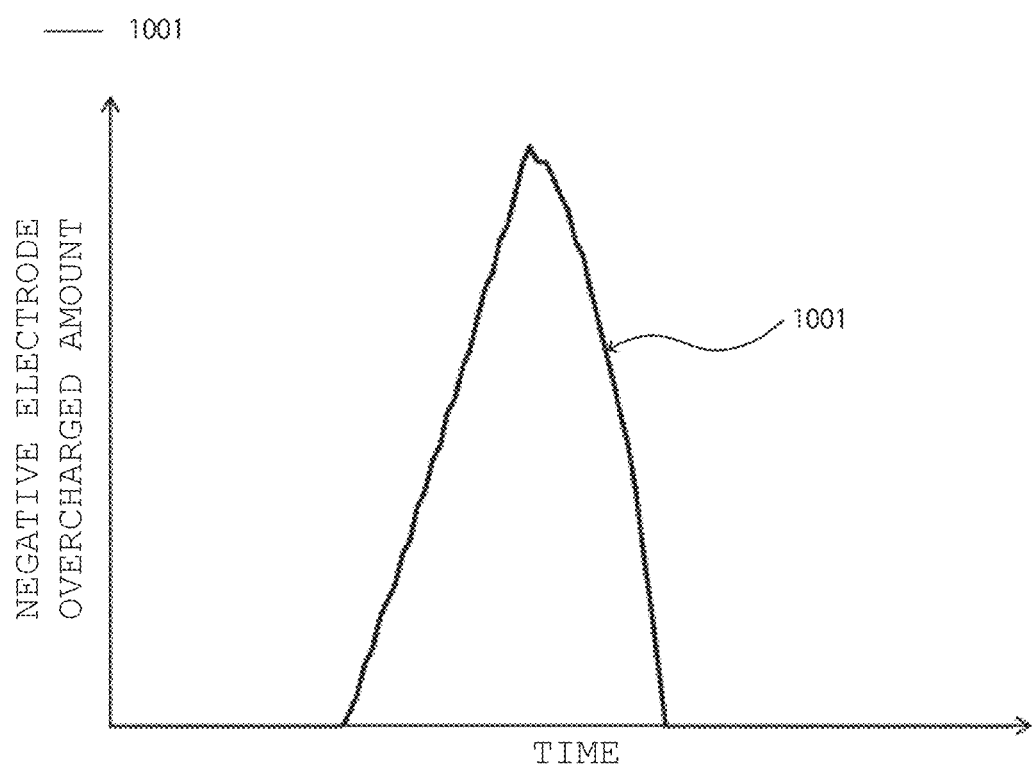
FIG. 10 is a graph illustrating an example of the transition during charging of the negative electrode overcharged amount according to an embodiment of the present disclosure.

FIG. 10 is a graph showing an example of the transition during charging of the negative electrode overcharged amount. A line segment (solid line) 1001 shows a current profile at the time of CC-CV charging according to the present technology, that is, a temporal transition of the negative electrode overcharged amount during charging.

When the overcharged amount is calculated, in step S54, the charge condition evaluation unit 21 of the evaluation unit 2 determines the charge condition so as to minimize the time integrated value of the negative electrode overcharged amount with respect to a certain charging time.

Figure 11:
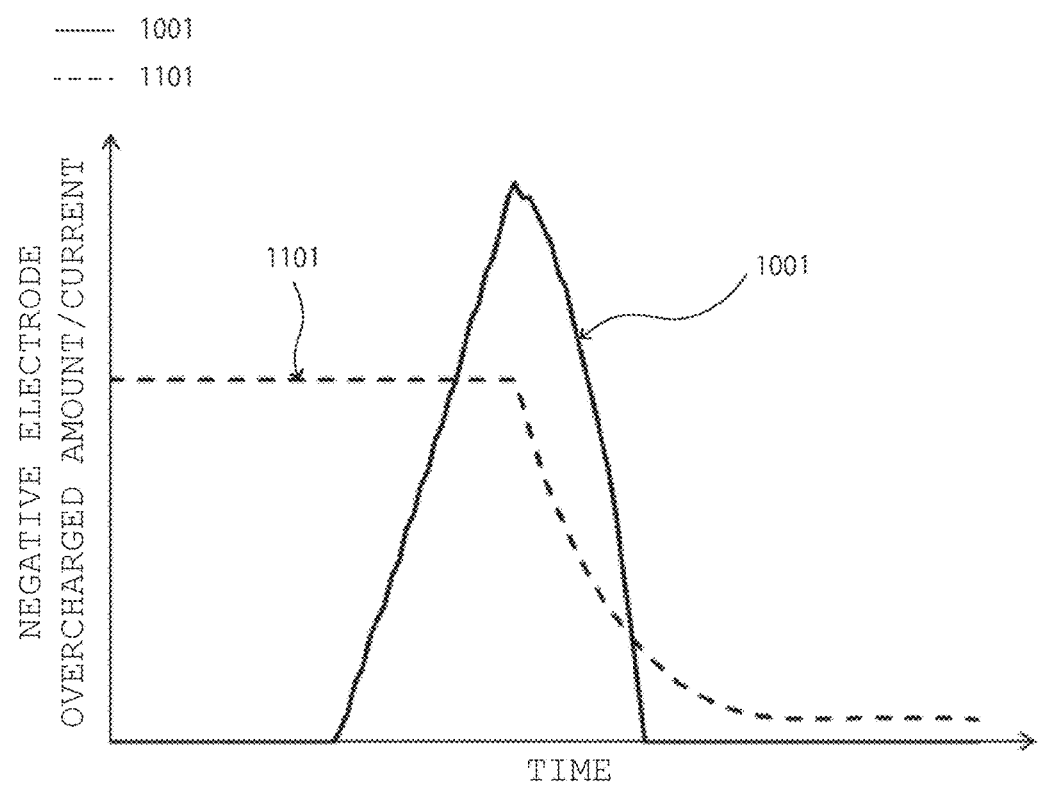
FIG. 11 is a graph illustrating an example of optimization of a charge condition according to an embodiment of the present disclosure.

The line segment (solid line) 1001 in FIG. 11 shows a current profile at the time of CC-CV charging according to the present technology as in FIG. 10, and the line segment (broken line) 1101 shows the negative electrode overcharged amount. The charge condition is determined so that the time integration of the negative electrode overcharged amount in FIG. 11 becomes small while satisfying the charging time. In the present embodiment, the charge condition satisfying a 30-minute charging rate of 50% and small negative electrode overcharged amount is determined.

Figure 12:
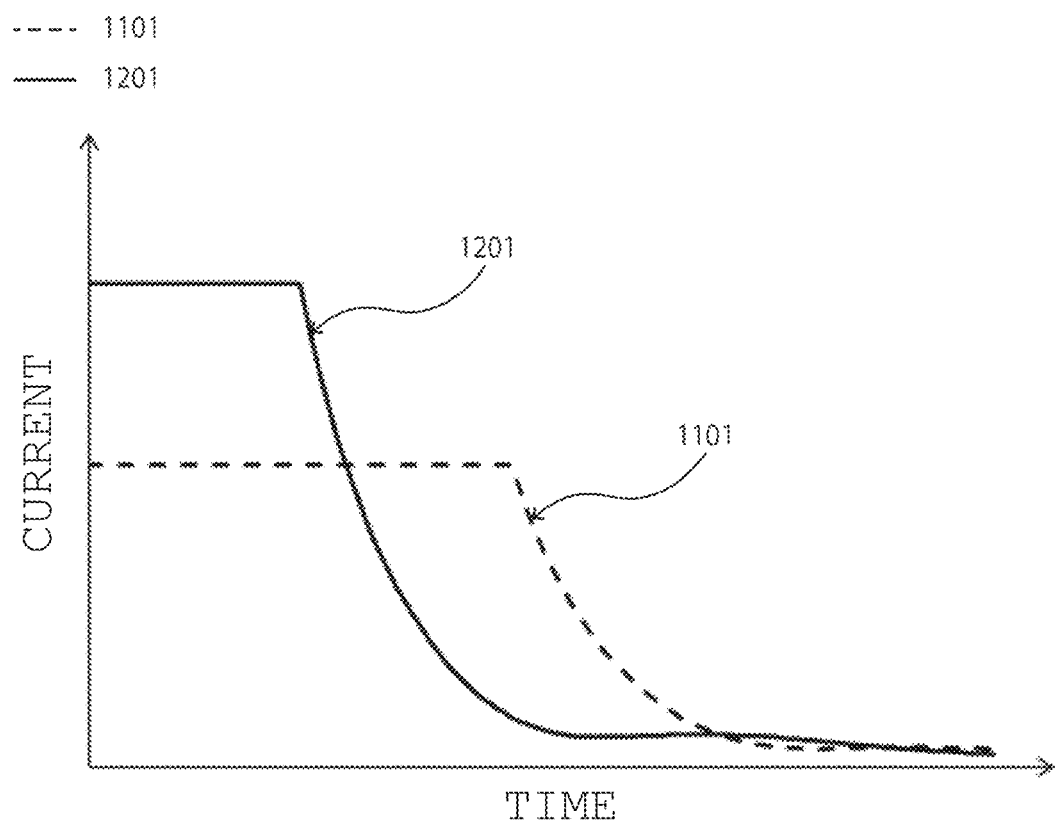
FIG. 12 is a graph illustrating an example of optimization of the charge condition according to an embodiment of the present disclosure.
Figure 13:
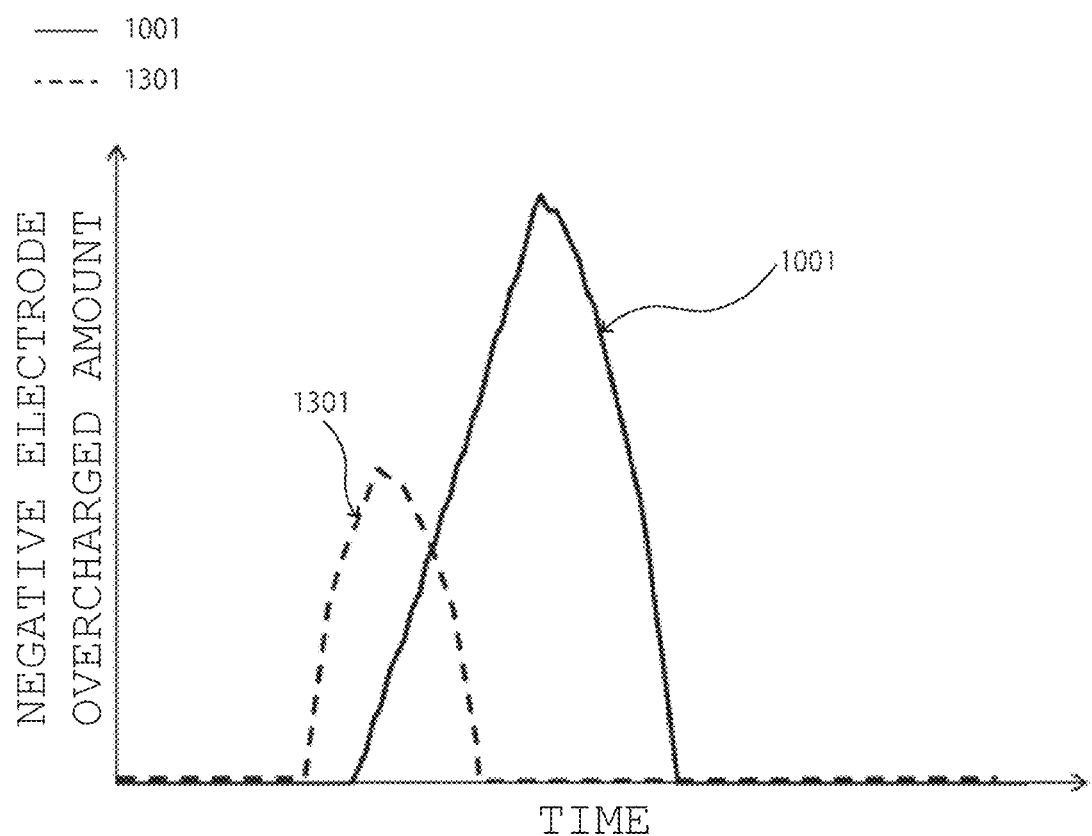
FIG. 13 is a graph illustrating an example of optimization of the charge condition according to an embodiment of the present disclosure.

The line segment (broken line) 1101 in FIG. 12 shows the negative electrode overcharged amount as in FIG. 11, and the line segment (solid line) 1201 shows an example of an optimized charging profile. The line segment (solid line) 1001 in FIG. 13 shows a current profile at the time of CC-CV charging according to the present technology as in FIG. 11, and the line segment (broken line) 1301 shows a current profile during CC-CV charging according to the conventional technique. FIG. 13 shows an example in which the above two negative electrode overcharged amounts are compared.

In step S55, the charge and discharge controller executes charge control of the secondary battery 4 using the charge control method of the present disclosure based on the above conditions. Then, charging of the secondary battery 4 is terminated.

As described above, in the present embodiment, on the basis of the evaluation results of the state detection circuitry 5, the determination circuitry 1 and the evaluation circuitry 2 of the charge and discharge control device 10, the charge/discharge controller can improve cycle characteristics by controlling the voltage/current application state to the battery at the time of charging or discharging the secondary battery 4, without lowering the volumetric energy density and without extending the charging time.

The present technology is described below in further detail according to an embodiment.

(1)

A charge/discharge control device comprising
a determination unit that determines an ion diffusion rate responsible for electric conduction in a secondary battery, and determines a time integrated value of an overcharged amount of an active material, based on the ion diffusion rate and a charge condition;
an evaluation unit that evaluates the charge condition of the secondary battery, based on a determination result obtained by the determination unit; and
a charge/discharge control unit that controls state of current application and voltage application to the secondary battery at the time of charging or discharging the secondary battery, based on an evaluation result obtained by the evaluation unit.

(2)

The charge/discharge control device according to (1), wherein the determination unit determines the ion diffusion rate, based on a voltage response analysis result at the time of applying and stopping a constant current.

(3)

The charge/discharge control device according to (1), wherein the determination unit determines the ion diffusion rate, based on a current response analysis result at the time of applying a constant voltage.

(4)

The charge/discharge control device according to (1), wherein the determination unit has an open circuit voltage (OCV) calculation unit that calculates an OCV of the secondary battery.

(5)

The charge/discharge control device according to (1), wherein the determination unit has an overcharged amount calculation unit that analyzes a concentration distribution of the active material and calculates a time integrated value of the overcharged amount.

(6)

The charge/discharge control device according to (5), wherein the overcharged amount calculation unit analyzes an outermost surface concentration of the active material, based on the ion diffusion rate and a charge condition, calculates charge depth from the outermost surface concentration, and calculates the time integrated value.

(7)

The charge/discharge control device according to (6), wherein the overcharged amount calculation unit determines a thickness of the active material in a region where the outermost surface concentration exceeds a threshold value and calculates the time integrated value during charging.

(8)

The charge/discharge control device according to (5), wherein the charge/discharge control unit increases a charge amount when the overcharged amount is smaller than a threshold value and decreases a charge amount when the overcharged amount is larger than the threshold value at the time of charging.

(9)

A charge/discharge control method comprising a determination step of determining an ion diffusion rate responsible for electric conduction in a secondary battery, and determining a time integrated value of an overcharged amount of an active material, based on the ion diffusion rate and a charge condition;

an evaluation step of evaluating the charge condition of the secondary battery, based on a determination result obtained by the determination step; and a control step of controlling state of current application and voltage application to the secondary battery at the time of charging or discharging the secondary battery, based on an evaluation result obtained by the evaluation step.

(10)

A battery pack comprising a secondary battery and the charge/discharge control device as defined in (1).

(11)

An electronic equipment comprising the battery pack as defined in (10) as a power supply source.

(12)

An electric vehicle comprising the battery pack as defined in (10), a conversion unit that converts electric power supplied from the battery pack into driving force, a driving unit that drives in accordance with the driving force, and a control unit that controls use state of the battery pack.

(13)

A power tool comprising the battery pack as defined in (10), and a movable part to which electric power is supplied from the battery pack.

(14)

A power storage system comprising the battery pack as defined in (10), one or more electric devices to which electric power is supplied from the battery pack, and a control unit that controls power supply from the battery pack to the electric devices.

The effects described herein are merely examples and are not limited, and other suitable properties relating to the present technology may be realized and as further described.

Hereinafter, embodiments of the present disclosure will be described in detail with reference to FIGS. 6 and 7. This embodiment relates to a charge control method, a manufacturing method, and a charge/discharge control device 10 of a secondary battery 4 according to a first embodiment of the present disclosure.

Figure 6:
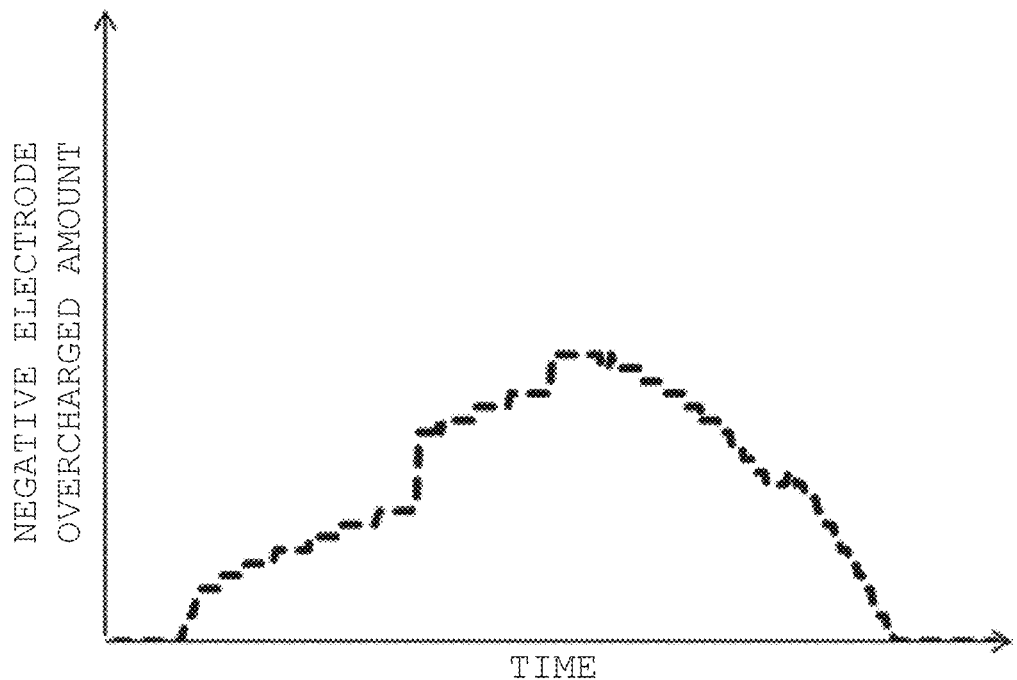
FIG. 6 is a graph illustrating an example in which a negative electrode overcharged amount is calculated using the charge/discharge control method according to an embodiment of the present disclosure.

FIG. 6 is a graph showing an example in which a negative electrode overcharged amount is calculated using the charge/discharge control method according to the present disclosure. In this example, a charge/discharge control test was performed using a lithium ion secondary battery fabricated by the method for manufacturing the secondary battery 4 described above as a sample. The lithium ion secondary battery was a polymer cell having lithium cobalt oxide as a positive electrode, graphite as a negative electrode, and a gel electrolyte and a separator between the positive electrode and the negative electrode.

In this example, a negative electrode having a composition of 94.5 parts by weight of Gr, 3.5 parts by weight of polyvinylidene fluoride, and 2 parts by weight of a conductive assistant was used as the negative electrode. Also, a positive electrode having a composition of 98 parts by weight of lithium cobalt oxide, 1.2 parts by weight of polyvinylidene fluoride, and 0.8 parts by weight of a conductive assistant was used as the positive electrode. In this example, charge/discharge control tests were carried out as a sample using the lithium ion secondary battery fabricated by the method for manufacturing the secondary battery 4 described above using these negative and positive electrodes.

In the charge/discharge control test of this example, the negative overcharged amount was calculated by calculation, and the pattern of the charge current was determined so that the time integrated value of the negative electrode overcharged amount becomes small (see FIG. 6). Cycle tests were performed until the discharge capacity retention rate reached 80% of the initial value.

Figure 7:
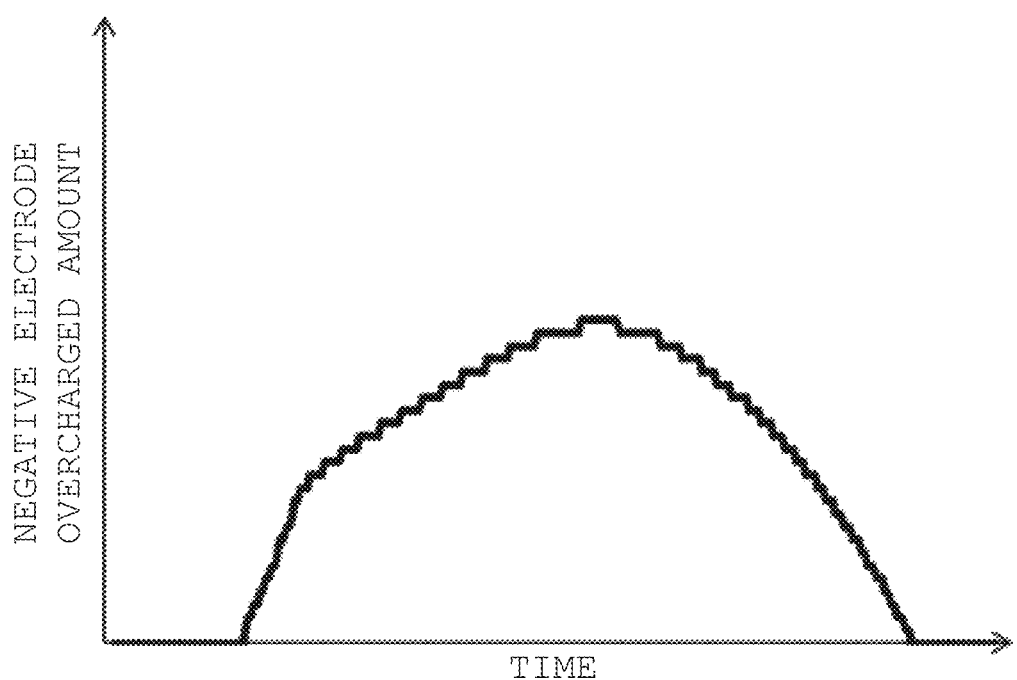
FIG. 7 is a graph illustrating a comparative example in which a negative electrode overcharged amount is calculated using the charge/discharge control method according to an embodiment of the present disclosure.

FIG. 7 is a graph showing a comparative example in which a negative electrode overcharged amount is calculated using the charge/discharge control method according to the present disclosure. In the charge/discharge control test of this example, normal charge/discharge control was performed as a first charge/discharge control. The conditions of normal charge/discharge control are as follows.

Charge: 2 C, CCCV, 4.35 V/0.05 C cut

Discharge: 1 C, 3 V cut

Pause: 10 minutes each

In Comparative Example 1, as in Example 1, the negative electrode overcharged amount was calculated (see FIG. 7). Cycle tests were performed until the discharge capacity retention rate reached 80% of the initial value.

Table 1 shows the cycle number ratio reaching 80% and the time integrated value of the negative electrode overcharged amount in Example A and Comparative Example B.

TABLE 1

| | Cycle number ratio reaching 80% | Time integrated value of negative electrode overcharged amount |
|---|---|---|
| Example A | 3.7 | 30,959 |
| Comparative Example B | 1 | 38,109 |

Further, determination of the charge condition in the charge condition evaluation unit 21 is performed by the following procedure as an example.

Procedure 1. Charging is performed at 3.3 C at the beginning of charging.
Procedure 2. CC charging is performed until the negative electrode overcharged amount becomes a positive value.
Procedure 3. CC charging is switched to CV charging when the negative electrode overcharged amount becomes a positive value.
Procedure 4. After 4.25 V, CC charging and CV charging are performed intermittently.
Procedure 5. The charge current values of 4.2 V to 4.25 V are verified, and conditions to satisfy the charging time (30-minutes charging rate of 80%) are determined.

Table 2 shows a relationship between charging voltage and CC charging and CV charging in Examples 1 to 6 for determining charge conditions.

TABLE 2

|  | Charging voltage (V) | Cc charging C rate | Cv charging cut C rate |
| --- | --- | --- | --- |
| Example 1 | 4.25 | 2.3 | 1.05 |
| Example 2 | 4.3 | 3.3 | 0.9 |
| Example 3 | 4.32 | 3.3 | 0.5 |
| Example 4 | 4.33 | 0.5 | 0.33 |
| Example 5 | 4.34 | 0.33 | 0.16 |
| Example 6 | 4.35 | 0.16 | 0.05 |

From the results shown in Table 1 and Table 2, it was confirmed that, in the case of the charge control method in consideration of the negative electrode overcharged amount of the present disclosure, cycle characteristics are improved without extending the charging time.

Hereinafter, application examples of the charge/discharge control device according to the present disclosure will be described with reference to the drawings.

A battery pack according to the present disclosure is a battery pack including a charge and discharge controller according to the present disclosure. Since the battery pack according to the present disclosure includes the charge and discharge controller according to the present disclosure having excellent battery characteristics, it leads to an improvement in performance of the battery pack.

Hereinafter, the battery pack according to the present disclosure will be described with reference to the drawings.

Figure 14:
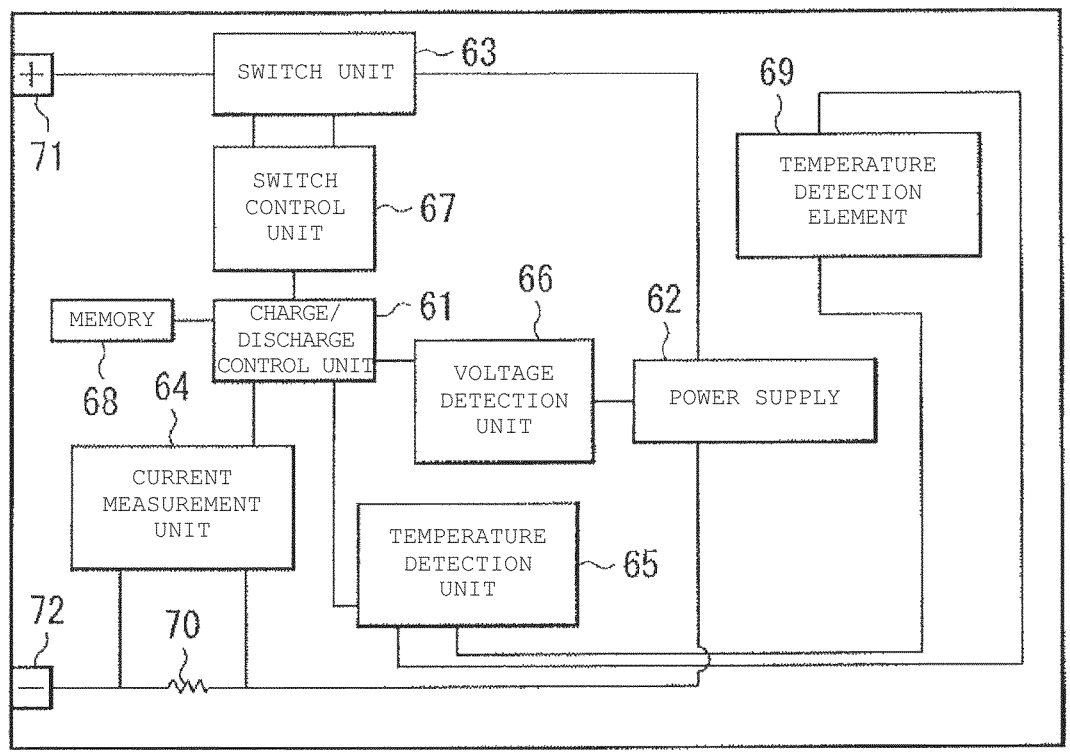
FIG. 14 is a schematic diagram illustrating a configuration example of a battery pack according to an embodiment of the present disclosure.

FIG. 14 shows a block configuration of the battery pack. The battery pack includes, for example, a control unit 61 (controller), a power supply 62, a switch unit 63, a current measurement unit 64, a temperature detection unit 65, a voltage detection unit 66, a switch control unit 67, a memory 68, a temperature detection element 69, a current detection resistor 70, a positive electrode terminal 71 and a negative electrode terminal 72, inside a housing 60 made of a plastic material or the like.

The control unit 61 (controller) controls the operation of the entire battery pack (including the use state of the power supply 62), and includes, for example, a central processing unit (CPU), a processor and the like. The power supply 62 includes one or more secondary batteries (not shown). The power supply 62 is, for example, an assembled battery including two or more secondary batteries, and the connection form of these secondary batteries may be in series, in parallel, or mixed in both types. For example, the power supply 62 includes six secondary batteries connected so as to be 2 parallel 3 series.

The switch unit 63 switches the use state of the power supply 62 (availability of the connection between the power supply 62 and an external device) according to the instruction of the control unit 61. The switch unit 63 includes, for example, a charge control switch, a discharge control switch, a charge diode, a discharge diode (none of which are shown), and the like. The charge control switch and the discharge control switch are, for example, semiconductor switches such as a field effect transistor (MOSFET) using a metal oxide semiconductor.

The current measurement unit 64 measures current using the current detection resistor 70 and outputs the measurement result to the control unit 61. The temperature detection unit 65 measures the temperature using the temperature detection element 69, and outputs the measurement result to the control unit 61. This temperature measurement result is used, for example, when the control unit 61 performs charge/discharge control at the time of abnormal heat generation, or when the control unit 61 performs correction processing at the time of calculating remaining capacity, or the like. The voltage detection unit 66 measures the voltage of the secondary battery in the power supply 62, analog-to-digital converts the measured voltage, and supplies it to the control unit 61.

The switch control unit 67 controls the operation of the switch unit 63, according to the signals input from the current measurement unit 64 and the voltage detection unit 66.

For example, when the battery voltage reaches an overcharge detection voltage, the switch control unit 67 disconnects the switch unit 63 (charging control switch) and controls so that charge current does not flow in a current path of the power supply 62. As a result, in the power supply 62, only discharge is possible via the discharge diode. The switch control unit 67 is configured to cut off the charge current, for example, when large current flows at the time of charging.

Further, for example, when the battery voltage reaches an overdischarge detection voltage, the switch control unit 67 disconnects the switch unit 63 (discharge control switch) so that discharge current does not flow in a current path of the power supply 62. As a result, in the power supply 62, only charging is possible via the charge diode. The switch control unit 67 is configured to cut off the discharge current, for example, when large current flows at the time of discharging.

In the secondary battery, for example, the overcharge detection voltage is 4.2 V±0.05 V, and the overdischarge detection voltage is 2.4 V+0.1 V.

The memory 68 is, for example, an EEPROM as a nonvolatile memory or the like. The memory 68 stores, for example, numerical values calculated by the control unit 61, information of the secondary battery measured at the manufacturing process stage (for example, internal resistance in the initial state), and the like. Incidentally, when a full charge capacity of the secondary battery is stored in the memory 68, the control unit 61 can grasp information such as the remaining capacity.

The temperature detection element 69 measures the temperature of the power supply 62 and outputs the measurement result to the control unit 61, and is, for example, a thermistor or the like.

The positive electrode terminal 71 and the negative electrode terminal 72 are terminals connected to an external device (for example, a notebook personal computer) operated using a battery pack and an external device (for example, a charger) used for charging a battery pack. Charging and discharging of the power supply 62 is performed via the positive electrode terminal 71 and the negative electrode terminal 72.

Figure 15:
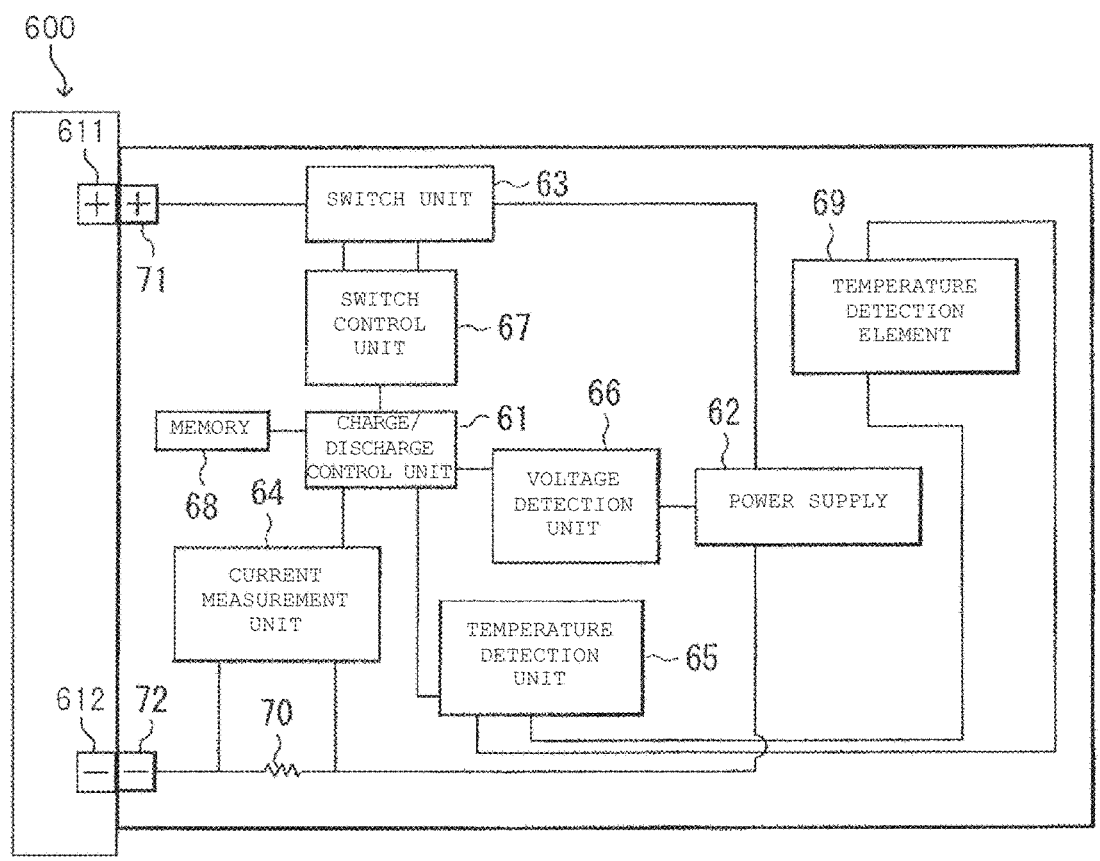
FIG. 15 is a schematic diagram illustrating a configuration example of an electronic equipment according to an embodiment of the present disclosure.

The electronic equipment according to the present disclosure shown in FIG. 15 is an electronic equipment including the battery pack according to the present disclosure as a power supply source. As described above, the electronic equipment according to the present disclosure is an equipment that exhibits various functions using a secondary battery as a power supply (power supply source) for driving. Since the electronic equipment according to the present disclosure includes the charge/discharge control unit according to the present disclosure having excellent charge and discharge characteristics, it leads to improvement in performance of the electronic equipment.

An electric vehicle according to the present disclosure is an electric vehicle including the charge/discharge control device according to the present disclosure. Since the electric vehicle according to the present disclosure includes the charge/discharge control device according to the present disclosure having excellent battery characteristics, it leads to an improvement in performance of the electric vehicle.

Hereinafter, the electric vehicle according to the present disclosure will be described with reference to the drawings.

Figure 16:
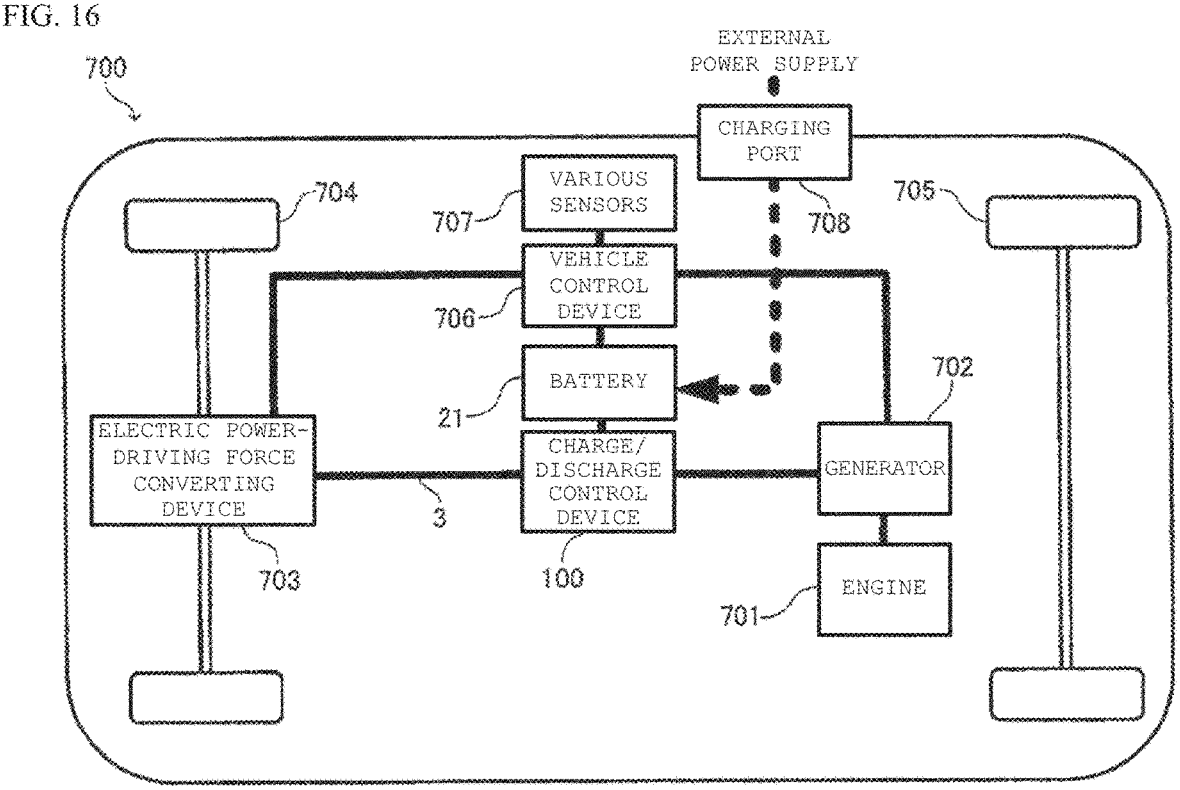
FIG. 16 is a schematic diagram illustrating a configuration example of an electric vehicle according to an embodiment of the present disclosure.

FIG. 16 shows a block configuration of a hybrid vehicle as an example of an electric vehicle. The electric vehicle includes, for example, a control unit 74 (controller), an engine 75, a power supply 76, a drive motor 77, a differential device 78, a generator 79, a transmission 80 and a clutch 81, inverters 82 and 83, and various sensors 84, inside a housing 73 made of metal. Besides, the electric vehicle includes, for example, a front wheel drive shaft 85 and a front wheel 86 that are connected to the differential gear 78 and the transmission 80, a rear wheel drive shaft 87 and a rear wheel 88.

This electric vehicle can run, for example, using either one of the engine 75 and the motor 77 as a drive source. The engine 75 is a main power source, and is, for example, a petrol engine or the like. When the engine 75 is used as a power source, the driving force (torque) of the engine 75 is transmitted to the front wheel 86 or the rear wheel 88 via, for example, the differential device 78, the transmission 80, and the clutch 81 which are driving units. The torque of the engine 75 is also transmitted to the generator 79. The generator 79 uses the torque to generate AC power and the AC power is converted into DC power via the inverter 83, and accumulated in the power supply 76. On the other hand, when the motor 77 as a conversion unit (converter) is used as a power source, the power (DC power) supplied from the power supply 76 is converted into AC power via the inverter 82, and the motor 77 is driven using the AC power. The driving force (torque) converted from the electric power by the motor 77 is transmitted to the front wheel 86 or the rear wheel 88 via, for example, the differential unit 78, the transmission 80, and the clutch 81 which are driving units (drivers).

Incidentally, when the speed of the electric vehicle is reduced via a brake mechanism (not shown), the resistance at the time of deceleration is transmitted to the motor 77 as a torque. The motor 77 may generate AC power by using the torque. It is preferable that the AC power is converted into DC power via the inverter 82, and the DC regenerative power thereof is preferably accumulated in the power supply 76.

The control unit 74 (controller) controls the operation of the whole electric vehicle, and includes, for example, a CPU, a processor and the like. The power supply 76 includes one or more secondary batteries (not shown). The power supply 76 may be connected to an external power supply and may be capable of accumulating electric power by receiving power supply from the external power supply. The various sensors 84 are used, for example, for controlling the opening degree (throttle opening degree) of a throttle valve (not shown) by controlling the rotation speed of the engine 75. The various sensors 84 include, for example, a speed sensor, an acceleration sensor, an engine speed sensor, and the like.

The case where the electric vehicle is a hybrid automobile has been described above. However, the electric vehicle may be a vehicle (electric automobile) that works using only the power supply 76 and the motor 77 without using the engine 75.

A power storage system according to the present disclosure is a power storage system including the electric vehicle according to the present disclosure. Since the power storage system according to the present disclosure includes the electric vehicle according to the present disclosure having excellent charge and discharge characteristics, it leads to improvement in performance of the power storage.

Hereinafter, the power storage system according to the present disclosure will be described with reference to the drawings.

Figure 17:
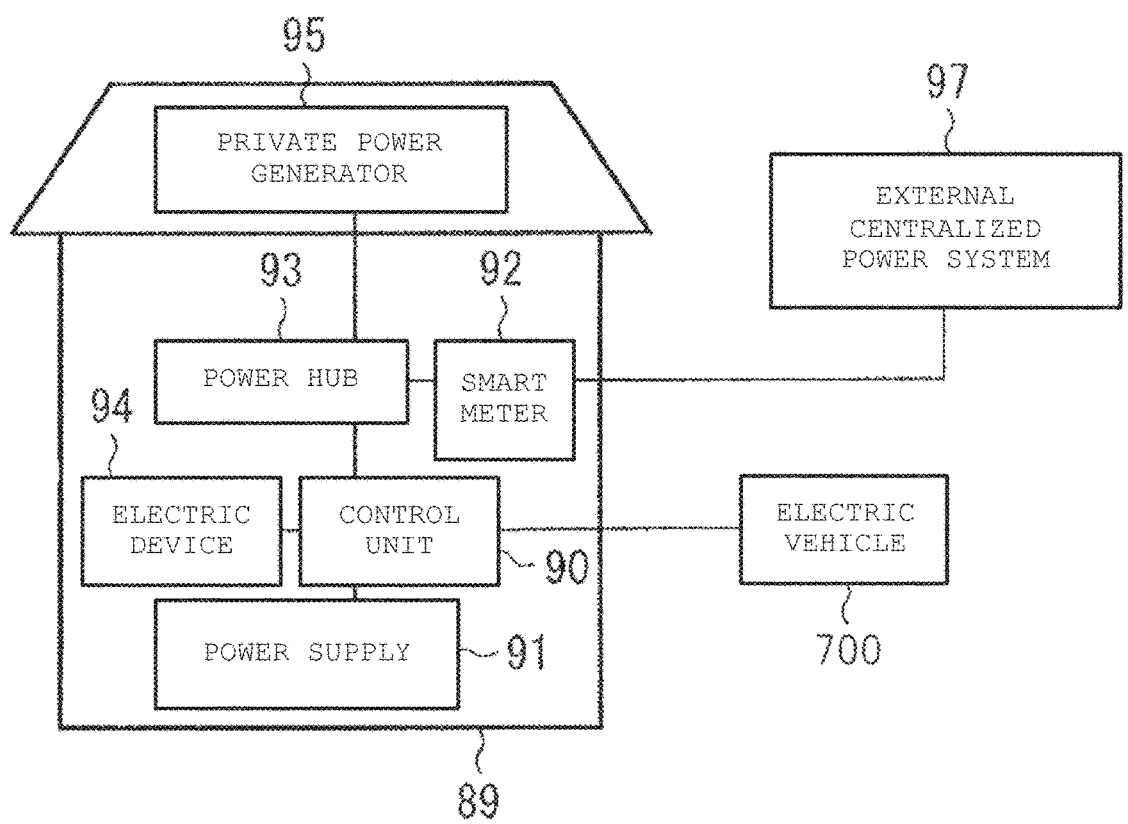
FIG. 17 is a schematic diagram illustrating a configuration example of a power storage system according to an embodiment of the present disclosure.

FIG. 17 shows a block configuration of the power storage system. The power storage system includes, for example, a control unit 90 (controller), a power supply 91, a smart meter 92, and a power hub 93, inside a house 89 such as a general residence and a commercial building.

Here, for example, the power supply 91 is connected to an electric device 94 installed inside the house 89 and is connectable to an electric vehicle 700 stopped outside the house 89. Further, for example, the power supply 91 is connected to a private power generator 95 installed in the house 89 via the power hub 93, and is connectable to an external centralized power system 97 via the smart meter 92 and the power hub 93.

Incidentally, the electric device 94 includes, for example, one or more home electric appliances such as a refrigerator, an air conditioner, a television, and a water heater. The private power generator 95 is, for example, any one or more kinds of solar power generators, wind power generators, and the like. The electric vehicle 700 is, for example, one or more kinds of electric automobiles, electric motorcycles, hybrid cars, and the like. The centralized power system 97 is, for example, one or more kinds of thermal power plants, nuclear power plants, hydraulic power plants, wind power plants, and the like.

The control unit 90 (controller) controls the operation of the entire power storage system (including the use state of the power supply 91), and includes, for example, a CPU, processor and the like. The power supply 91 includes one or more secondary batteries (not shown). The smart meter 92 is, for example, a network-compliant power meter installed in a house 89 of an electric power consumer, and is capable of communicating with an electric power supplier. Along with this, the smart meter 92 controls the balance between demand and supply in the house 89, for example, while communicating with the outside, thereby enabling efficient and stable supply of energy.

In the power storage system, for example, power is accumulated in the power supply 91 from the centralized power system 97, which is an external power supply, via the smart meter 92 and the power hub 93, and electric power is accumulated in the power supply 91 from the solar power generator 95, which is an independent power supply, via the power hub 93. Since the electric power accumulated in the power supply 91 is supplied to the electric device 94 and the electric vehicle 96 in accordance with the instruction of the control unit 90, the electric device 94 can be operated, and the electric vehicle 96 can be charged. That is, the power storage system is a system that enables electric power to be accumulated and supplied in the house 89 using the power supply 91.

The electric power stored in the power supply 91 can be arbitrarily used. For this reason, for example, electric power is accumulated in the power supply 91 from the centralized power system 97 in the middle of the night when the amount of electricity used is inexpensive, and the electric power accumulated in the power supply 91 can be used in the daytime when the amount of electricity used is expensive.

The above-described power storage system may be installed for each house (one household) or may be installed for each of plural houses (plural households).

A power tool according to the present disclosure is a power tool including the charge/discharge control unit (the charge/discharge controller) according to the present disclosure. Since the power tool according to the present disclosure includes the charge/discharge control unit according to the present disclosure having excellent charge and discharge characteristics, it leads to improvement in performance of the power tool.

Hereinafter, the power tool according to the present disclosure will be described with reference to the drawings.

Figure 18:
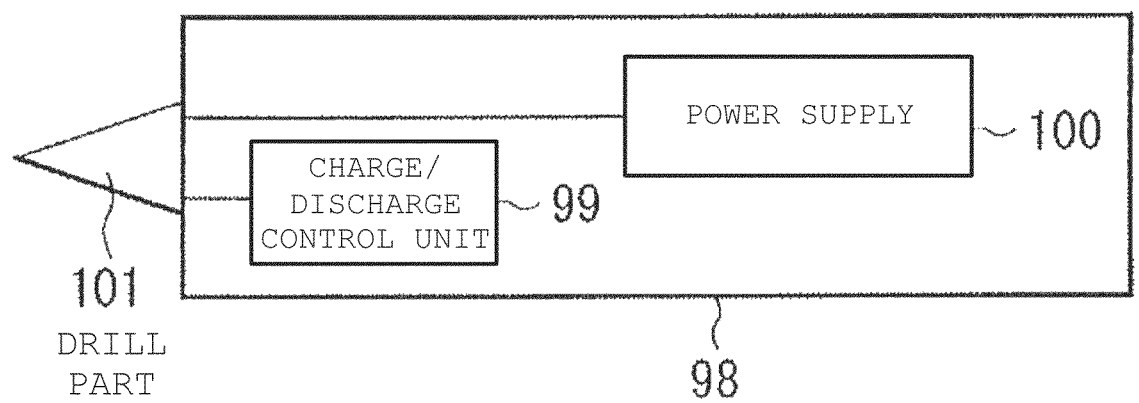
FIG. 18 is a schematic diagram illustrating a configuration example of a power tool according to an embodiment of the present disclosure.

FIG. 18 shows a block configuration of the power tool. The electric power tool is, for example, an electric drill, and includes a control unit 99 (controller) and a power supply 100, inside a tool body 98 made of a plastic material or the like. For example, a drill part 101 as a movable part is attached to the tool main body 98 in an operable (rotatable) manner.

The control unit 99 controls the operation of the entire electric power tool (including the use state of the power supply 100), and includes, for example, a CPU, processor and the like. The power supply 100 includes one or more secondary batteries (not shown). The control unit 99 supplies electric power from the power supply 100 to the drill part 101 according to operation of an operation switch (not shown).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A charge and discharge control device comprising:
a determination circuitry configured to determine an ion diffusion rate associated with electric conduction in a secondary battery, and determine a time integrated value of an overcharged amount of an active material based on the ion diffusion rate and a charge condition, wherein the determination circuitry has an overcharged amount calculation circuit configured to analyze a concentration distribution of the active material and calculate the time integrated value of the overcharged amount;
an evaluation circuitry configured to evaluate the charge condition of the secondary battery based on a determination result obtained by the determination circuitry; and
a charge and discharge controller configured to control state of current application and voltage application to the secondary battery at a time of charging or discharging the secondary battery based on an evaluation result obtained by the evaluation circuitry.

2. The charge and discharge control device according to claim 1, wherein the determination circuitry is configured to determine the ion diffusion rate based on a voltage response analysis result at a time of applying and stopping a constant current.

3. The charge and discharge control device according to claim 1, wherein the determination circuitry is configured to determine the ion diffusion rate based on a current response analysis result at a time of applying a constant voltage.

4. The charge and discharge control device according to claim 1, wherein the determination circuitry has an open circuit voltage (OCV) calculation circuit configured to calculate an OCV of the secondary battery.

5. The charge and discharge control device according to claim 1, wherein the overcharged amount calculation circuit is configured to analyze an outermost surface concentration of the active material based on the ion diffusion rate and a charge condition, calculate charge depth from the outermost surface concentration, and calculate the time integrated value.

6. The charge and discharge control device according to claim 5, wherein the overcharged amount calculation circuit is configured to determine a thickness of the active material in a region where the outermost surface concentration exceeds a threshold value and calculate the time integrated value during charging.

7. The charge and discharge control device according to claim 1, wherein the charge and discharge controller increases a charge amount when the overcharged amount is smaller than a threshold value and decreases a charge amount when the overcharged amount is larger than the threshold value at the time of charging.

8. A charge and discharge control method comprising:
a determination step of determining an ion diffusion rate associated with electric conduction in a secondary battery, determining a time integrated value of an overcharged amount of an active material based on the ion diffusion rate and a charge condition, and analyze a concentration distribution of the active material and calculate the time integrated value of the overcharged amount;
an evaluation step of evaluating the charge condition of the secondary battery based on a determination result from the determination step; and
a control step of controlling state of current application and voltage application to the secondary battery at a time of charging or discharging the secondary battery based on an evaluation result from the evaluation step.

9. A battery pack comprising:
a secondary battery and
the charge and discharge control device according to claim 1.

10. An electronic equipment comprising the battery pack according to claim 9 as a power supply source.

11. An electric vehicle comprising:
the battery pack according to claim 9,
a converter configured to convert electric power supplied from the battery pack into driving force,
a driver configured to drive in accordance with the driving force, and
a controller configured to control use state of the battery pack.

12. A power tool comprising:
the battery pack according to claim 9, and
a movable part to which electric power is configured to be supplied from the battery pack.

13. A power storage system comprising:
the battery pack according to claim 9,
one or more electric devices to which electric power is configured to be supplied from the battery pack, and
a controller configured to control power supply from the battery pack to the electric devices.

\* \* \* \* \*